ROTATIONAL SYNCHRONIZING SYSTEM

Original Filed March 7, 1956

INVENTOR
MAURICE J. RAFFENSPERGER

BY Joseph J. Connector

ATTORNEY

ROTATIONAL SYNCHRONIZING SYSTEM

Original Filed March 7, 1956

Sept. 7, 1965 M. J. RAFFENSPERGER 3,205,418

ROTATIONAL SYNCHRONIZING SYSTEM

Original Filed March 7, 1956 7 Sheets-Sheet 5

Sept. 7, 1965 M. J. RAFFENSPERGER 3,205,418

ROTATIONAL SYNCHRONIZING SYSTEM

Original Filed March 7, 1956 7 Sheets-Sheet 6

United States Patent Office 3,205,418
Patented Sept. 7, 1965

3,205,418
ROTATIONAL SYNCHRONIZING SYSTEM

Maurice J. Raffensperger, Redondo Beach, Calif., assignor to International Business Machines Corporation, New York, N.Y., a corporation of New York Original application Mar. 7, 1956, Ser. No. 569,999, now Patent No. 3,072,818. Divided and this application May 1, 1961, Ser. No. 112,149
9 Claims. (Cl. 318—13)

The present invention relates to a synchronous control system, and more particularly, to a system for synchronizing the rotation of two revolving members.

This application is a division of applicant's copending application, Serial No. 569,999, now U.S. Patent 3,072,818.

In the art of processing data representative of the position of various objects within any given area, it may be desirable to filter the information such that data representative of the position of certain objects is not processed. In accordance with the principles of the present invention, both desired and undesired data are suitably displayed, so that the undesired data may be readily filtered. Assuming that the object position data is provided by a PPI type radar, it is necessary to synchronize the rotation of the remotely positioned radar antenna with the rotation of the yoke of the CRT on which the data is displayed to provide an identification of the exact location of the various objects within the displayed area. This is accomplished in the instant invention by utilizing the radar azimuth signals to control the rotation of the deflection yoke of the display cathode ray tube. Initial position synchronism is obtained by utilizing the radar North signals, hereinfater designated North control signals, to control the operation of the motor control circuit in accordance with the time difference between the control and yoke North signals. The motor may be either stopped or rotated at double speed for the interval between the control and yoke North signals in accordance with whether the yoke North signal leads or lags the control North signal. Synchronization is maintained by comparing the control and yoke North signals once per revolution and actuating the motor control circuit in accordance with the time difference between the signals. To prevent a loss of synchronization which could result from a missing azimuth signal, the instant invention detects the absence of an azimuth signal and generates a substitute signal therefore. The present invention further controls the entry time for azimuth signals to eliminate or substantially reduce the entry of spurious signals.

Accordingly, a primary object of the present invention is to provide an improved data filtering apparatus.

Another object of the present invention is to provide a system for synchronizing the rotation of two rotatable members.

Still another object of the present invention is to provide an improved motor drive and synchronizing circuit wherein a 60 cycle source is initially utilized to drive a synchronous motor above its normal operating speed before the motor becomes synchronized with the input signals.

Another object of the present invention is to provide an improved apparatus for synchronizing the rotation of the yoke of a cathode ray tube with the rotation of a remote radar antenna.

Another object of the present invention is to provide an improved apparatus for maintaining the motor driven deflection yoke of a cathode ray tube in synchronism with a remote rotating member by producing a change in yoke speed while the speed of the yoke drive motor remains constant.

Another object of the present invention is to provide an improved correction circuit responsive to the time difference between the reference points of two rotating shafts and adapted to provide the necessary correction to bring the two shafts into position synchronism.

Another and still further object of the present invention is to provide a position correction circuit adapted to synchronize a rotating member and a lagging motor driven deflection yoke by computing the error time between the North reference positions of a rotating member and deflection yoke and driving the deflection yoke at double speed for the computed time interval.

A further object of the present invention is to provide an improved apparatus for maintaining synchronism between two remotely displaced shafts by stopping or double speeding one of said shafts for the necessary interval determined by said apparatus to bring the two shafts into position synchronization.

Another and still further object of the present invention is to provide an improved apparatus to ensure a true count of incoming repetitive signals by providing a substitute signal in the event that one of the anticipated incoming signals is not received within a predetermined interval of the anticipated time.

Another and still further object of the present invention is to provide an improved apparatus adapted to receive a succession of substantially uniformly spaced signals by delaying each of these signals for a sufficient interval to condition the apparatus for receiving the succeeding signal.

Another object of the present invention is to provide an improved apparatus adapted to receive a succession of signals at uniformly spaced intervals and to inhibit signals during the remaining intervals by using each of the normally spaced signals as gating signals for the suceeding signal after delaying them for the necessary interval.

Other objects of the invention will be pointed out in the following description and claims and illustrated in the accompanying drawings, which disclose, by way of example, the principle of the invention and the best mode, which has been contemplated, of applying that principle.

In the drawings:

FIGS. 1*a* and 1*b* when arranged end to end illustrate in simplified block form a Data Filter System constructed in accordance with the principles of the present invention.

Figure 1A:
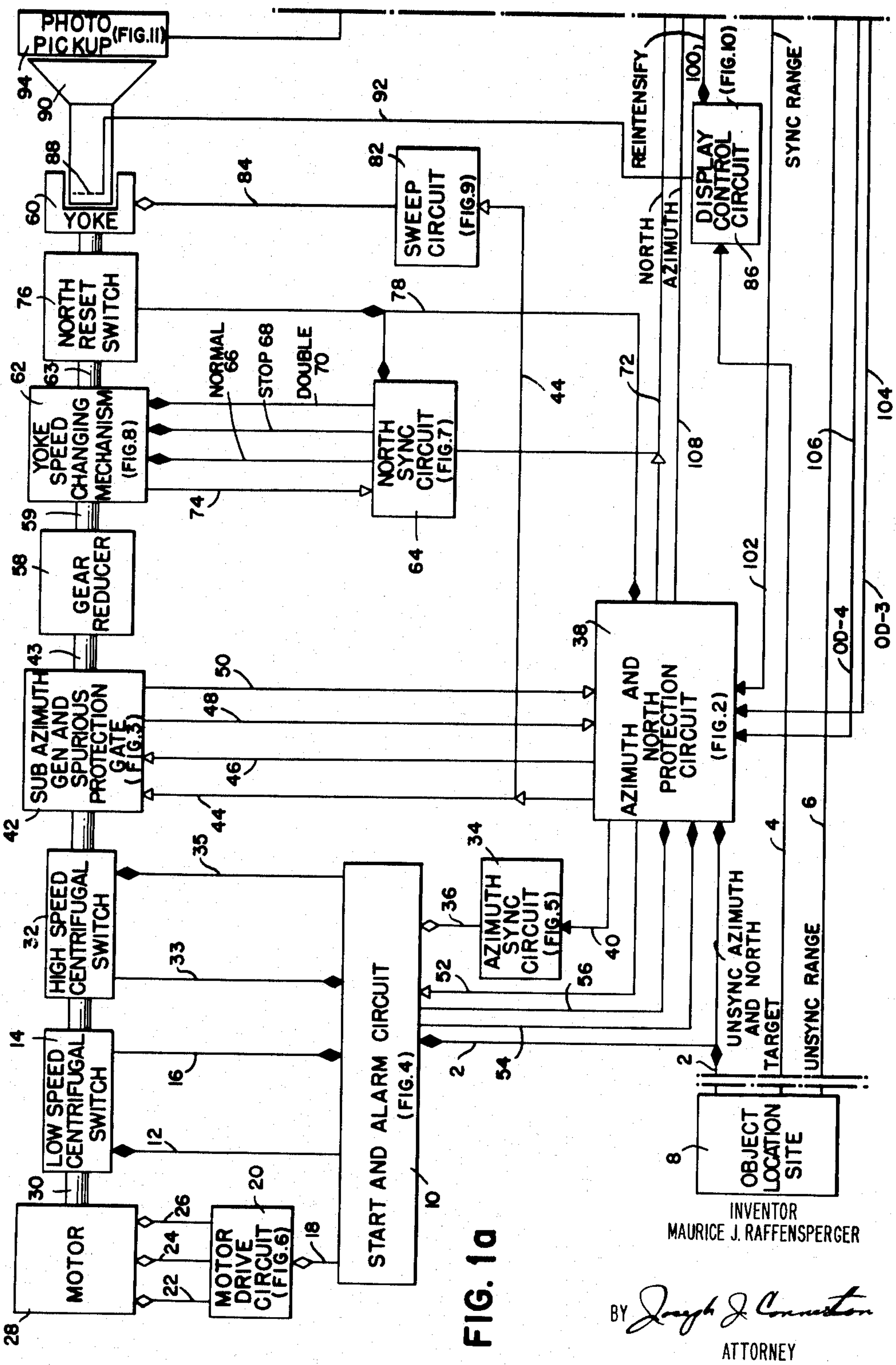
Figure 4A:
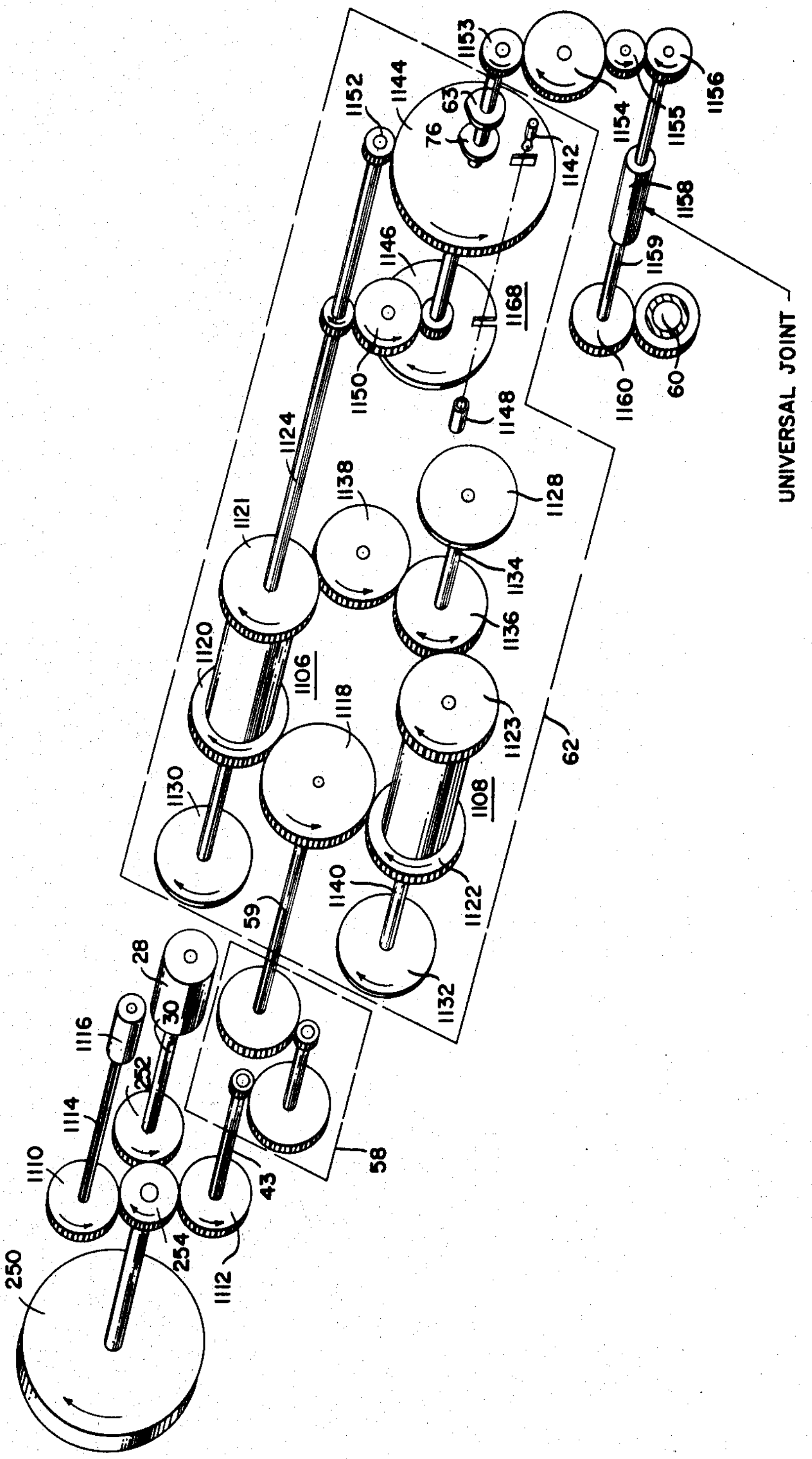

FIG. 4*a* illustrates in simplified block form the Yoke Speed Changing Mechanism identified as block 62 in FIG. 1*a*.

Figure 4B:
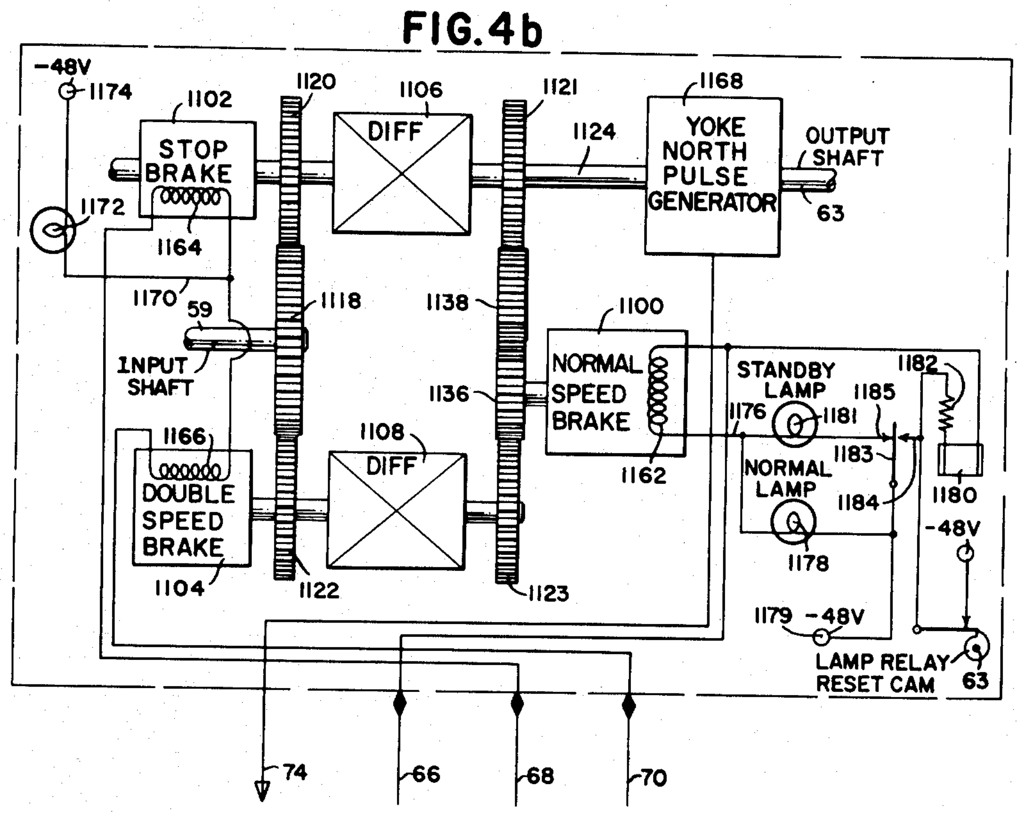

FIG. 4*b* illustrates in schematic form the Yoke Speed Changing Mechanism identified as block 62 in FIG. 1*a*.

Figure 4C:
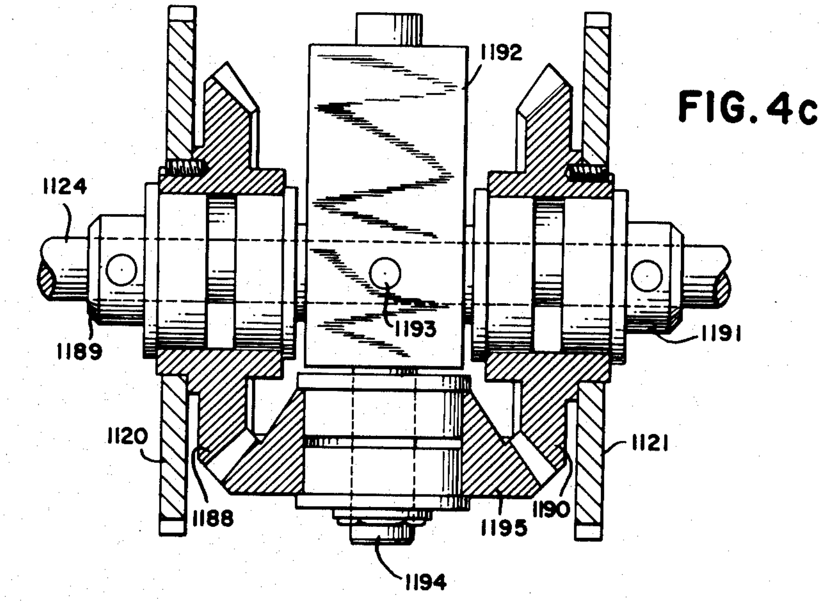

FIG. 4*c* illustrates in schematic form a differential of the type identified as differential 1108 in FIG. 8*b*.

Figure 1B:
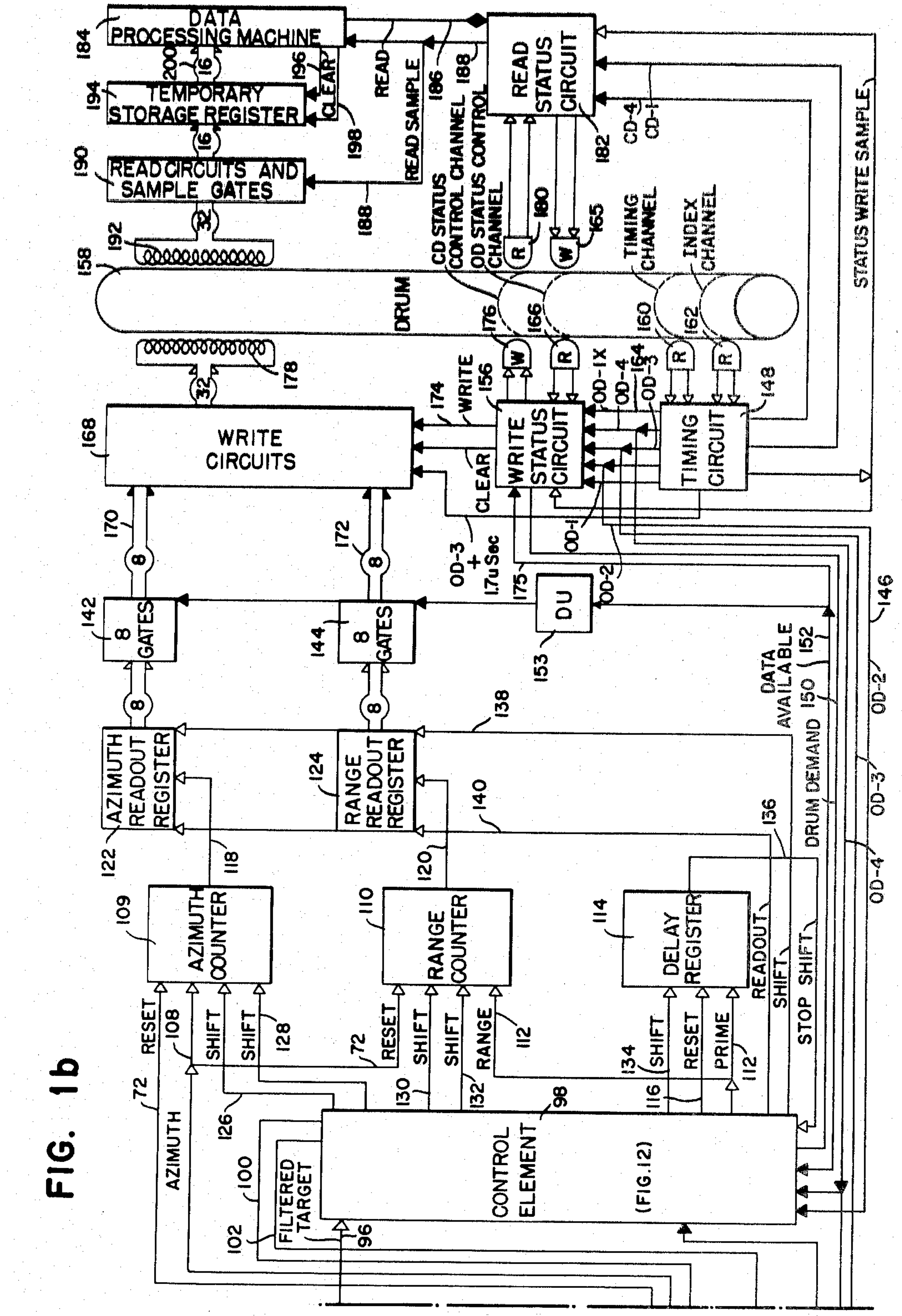
Figure 5:
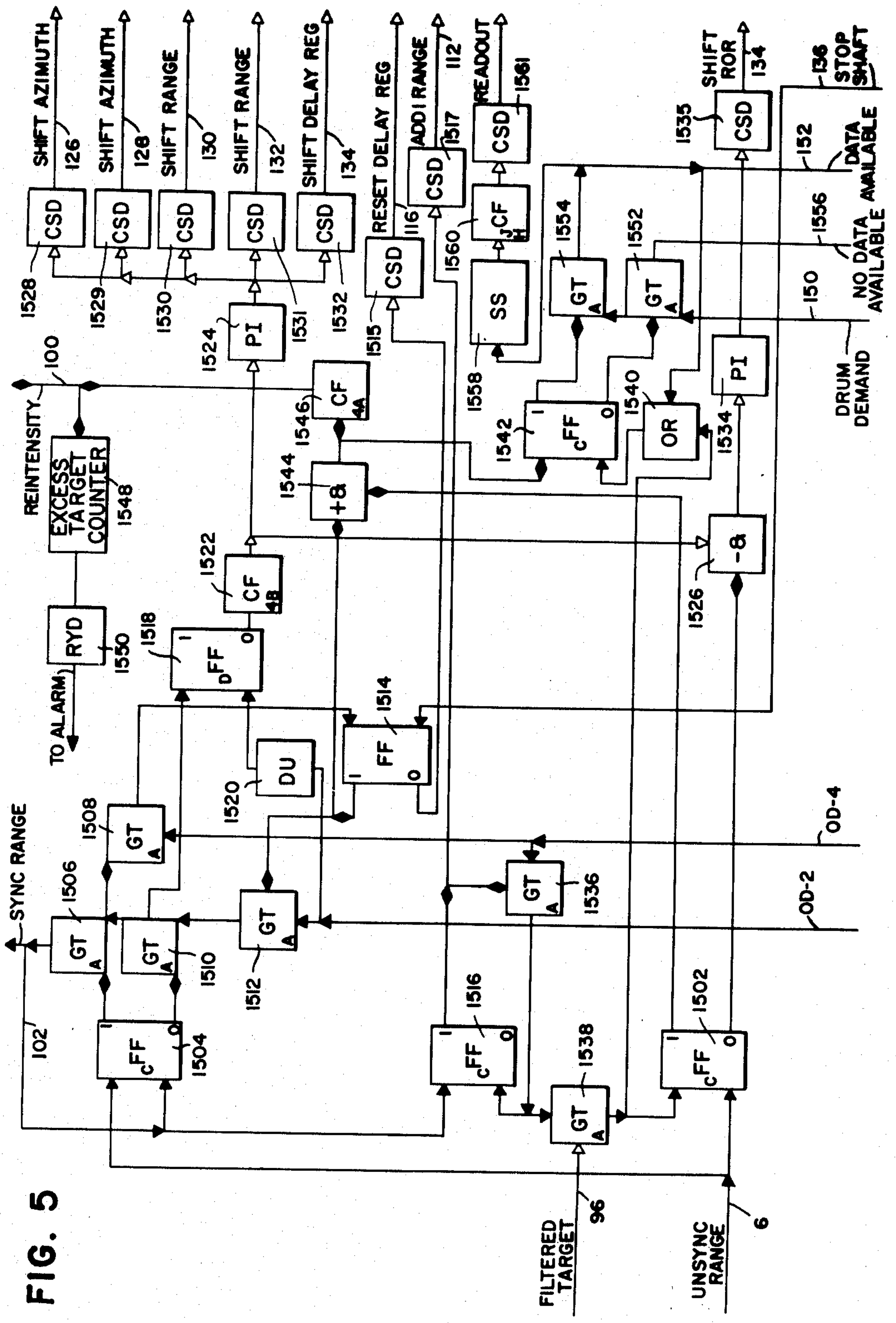

FIG. 5 illustrates in logical block form the Control Element identified as block 98 in FIG. 1*b*.

Figure 6:
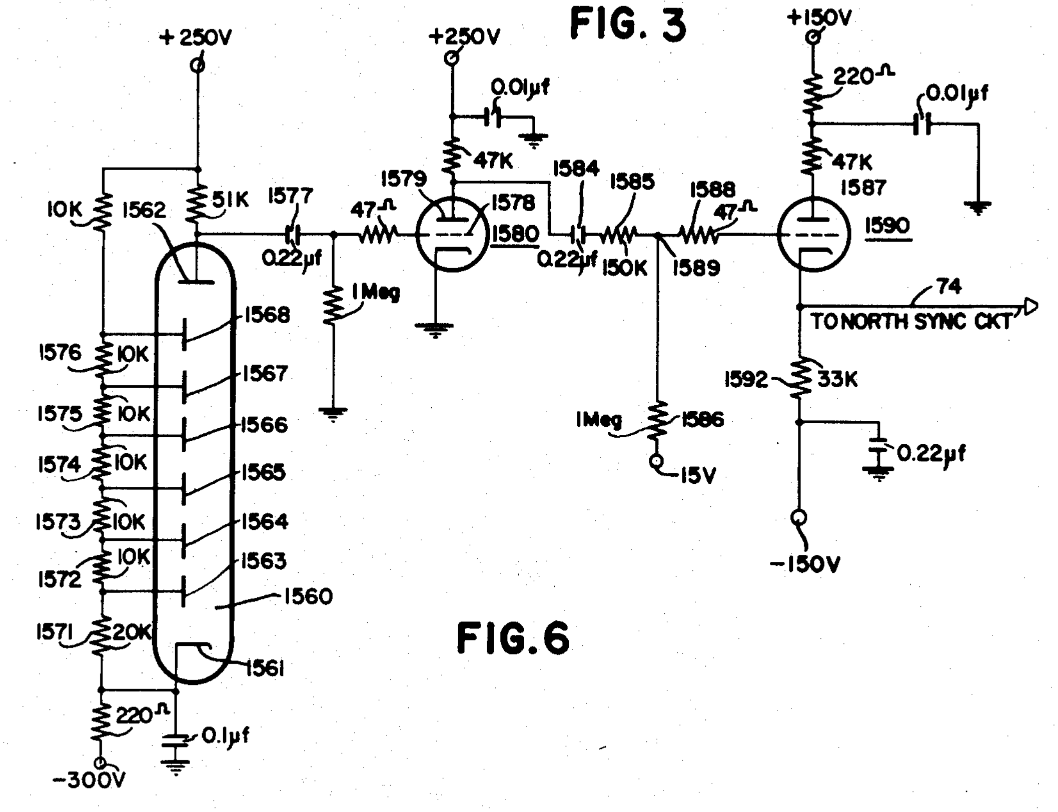

FIG. 6 illustrates in schematic form the Yoke North Pulse Generator identified as block 1119 in FIG. 8*a*.

*Conventions employed*

Throughout the following description and in the accompanying drawings there are certain conventions employed which are familiar to certain of those skilled in the art. Additional information concerning these conventions is as follows:

*In the block diagram figures of the drawings* a conventional solid arrowhead is employed to indicate (1) a circuit connection, (2) energization with standard positive pulses and (3) the direction of pulse travel which also indicates the direction of control. A similarly shaped hollow arrowhead is employed throughout the drawings to indicate a non-standard pulse having a duration considerably longer than the pulses indicated by a solid arrowhead, and although generally rectangular in form, in some cases are somewhat sawtooth in form, for example, signals produced by magnetic cores. A solid diamond-shaped arrowhead indicates (1) a circuit connection and (2) energization with a D.C. level. An open diamond-shaped arrowhead indicates analog signals, sinusoidal signals or triangular signals. Cables which are used to transfer data are indicated by two parallel lines widened in the form of a circle at some intermediate point, the numbers within the circle indicating the number of conductors. By this convention, cables employing the circle indicate that the conductors of that cable convey information by the presence or absence of a pulse in parallel transfer. D.C. levels are on the order of 10 volts when positive and 30 volts when negative except where otherwise indicated, whereas pulses indicated by conventional solid arrowheads and referred to as standard pulses are positive .1 microsecond half sine 20 to 40 volts. The input and output lines of the block symbols are connected to the most convenient side of the block including the same side in some cases. An input line to a corner of a block symbol and an output line from the adjacent corner of that symbol indicates that the pulse or D.C. level is applied to the input of the circuit represented by the block and the input conductor is electrically connected to the output conductor of the adjacent corner. Bold face character symbols appearing within a block symbol identify the common name of the circuit represented, that is, FF identifies a flip-flop, GT a gate circuit, OR a logical OR circuit, and so forth. The character subscripts preceding bold face characters identify the model of the circuit represented by the bold face character, that is, $_{C}$FF identifies a model C flip-flop, $_{A}$GT identifies a model A gate circuit and so forth.

In the description, azimuth and range signals are described as unsynchronized or synchronized. In the present embodiment, all incoming azimuth and range signals are unsynchronized with respect to the associated data processing machine, and thereafter referred to as synchronized azimuth and range signals respectively. The timing signals with which the incoming signals are synchronized are designated respectively as OD–1, OD–2, OD–3 and OD–4. These are standard .1 microsecond pulses occurring at intervals of 2.5 microseconds which are continuously recycled, that is, an OD–4 pulse is followed in 2.5 microseconds by an OD–1 pulse. The time at which these signals occur is designated as OD–1, OD–2, OD–3 and OD–4 time respectively. OD timing pulses may be generated by any conventional means, as for example, the Timing Pulse Generator described in copending application Serial Number 494,982 (IBM Docket 4490) filed by Robert R. Everett et al. on March 17, 1955.

Flip-flops employed throughout the present apparatus have two inputs and one or two outputs. A positive signal applied to either input is said to "Set" the flip-flop in the binary "1" or binary "0" state, resulting in a positive signal of 10 volts amplitude on the corresponding output and a negative signal of 30 volts amplitude on the other output. The binary "1" and "0" inputs are labeled accordingly. A positive signal applied simultaneously to both inputs is referred to as complementing the flip-flop, i.e., reversing its conduction state. For ease of illustration, the inputs and outputs may be shown on top or bottom, the inputs generally being identified by closed arrowheads.

*In the description* the general arrangement of the apparatus of a preferred embodiment of this invention will first be described with respect both to the manner in which the various circuit components and apparatus are interconnected and in respect to the general overall operation which is performed by these components and apparatus. The description of the general arrangement will be followed by separate and detailed descriptions of the various components and apparatus, which so require it, and each section of the description will have a heading which indicates the apparatus about to be descrbed.

*General description of data filter system*

*Referring now to the drawings and more particularly to FIG 1 thereof,* there is illustrated in block form a preferred embodiment of the present apparatus. Object location data consisting of unsynchronized azimuth and North signals, target signals and range signals on conductors 2, 4 and 6 respectively, are obtained from a remotely positioned object location site indicated as block 8. In one application, this object location site may comprise a polarized transmitting antenna rotating around its vertical axis wherein the object might comprise a target, the radial distance and the angular position of the target from the antenna comprising the range and azimuth of such target. However, since neither the object location site nor the mode of transmission of the above defined information to conductors 2, 4 and 6 constitutes a part of the present invention, a detailed description is considered unnecessary for an understanding thereof.

Unsynchronized azimuth information on conductor 2 comprises a serial of substantially rectangular flat topped signals varying between 200 and 400 microseconds in duration which occur 256 times per scan of the rotating antenna or approximately once for each 1.4 degrees of radar antenna rotation. North signals on conductor 2 comprise an azimuth signal closely followed by another similar signal which is interpreted as a North signal, which occurs only once per radar antenna scan at the radar North position. Unsynchronized range information on conductor 6 may comprise a series of standard .1 microsecond pulses which in the preferred embodiment recur at approximately 625 microsecond intervals. These .1 microsecond range signals occur approximately in the center of the time interval during which azimuth signals can appear. In the preferred embodiment, a total of 64 range signals occur between normally spaced azimuth signals. Target information on conductor 4 comprises similar 0.1 microsecond pulses which occur in synchronism with unsynchronized range signals which appear at a rate dependent upon the remote radar target return. The azimuth signal's repetition rate is determined by the speed of rotation of the remote radar antenna, which may vary for example between 2 and 11 r.p.m. While the present apparatus is designed to operate over the above described range, to simplify the description and timing of the preferred embodiment, the antenna will be assumed to rotate at a nominal speed of 6 r.p.m. At this assumed speed, the azimuth pulse rate is 25.6 cycles per second, while the corresponding azimuth pulse rates for 2 and 11 r.p.m. are approximately 8.4 and 47 cycles per second.

To initially start operation, a potential is applied from Start and Alarm Circuit 10 through conductor 12, low speed centrifugal switch 14 and conductor 16 to complete a circuit through which unsynchronized azimuth pulses on conductor 2 are applied to Start and Alarm Circuit 10. After a predetermined number of these pulses have been applied to the Start and Alarm circuit within a time interval consistent with the slowest specified speed of operation, a circuit is completed within the Start and Alarm Circuit 10 through which a 60 cycle source is applied through conductor 18 to motor drive circuit 20. Motor drive circuit 20, in response to this 60 cycle voltage, generates a two phase alternating potential which is applied through conductors 22, 24 and 26 to synchronous motor 28. Synchronous motor 28 is thereby initially energized with a 60 cycle source.

Motor 28, hereinafter referred to as the azimuth drive motor, is a conventional two pole hysteresis synchronous motor having a nominal impedance of approximately 360 ohms, and operating from the two phase input supplied by motor drive circuit 20 to provide a high and substantially uniform torque from zero to 100% slippage. A hysteresis synchronous motor is utilized in the preferred embodiment partially because of its superior starting torque characteristics and the fact that no auxiliary starting circuit is required. Motor 28 has an output shaft 30 to which a plurality of mechanisms such as low speed centrifugal switch 14 is connected.

As is well known in the art, the synchronous speed of a two pole synchronous motor driven by a 60 cycle source is 3600 r.p.m. When motor 28 accelerates to a speed of approximately 500 r.p.m. the contacts of low speed centrifugal switch 14 open, thereby de-energizing the previously described circuit from the Start and Alarm Circuit 10. However, a second circuit maintains the 60 cycle source applied to the motor drive circuit until the completion of the start cycle. As the motor reaches a speed slightly above its maximum normal operating speed, 256 times 11 or 2,816 r.p.m. at the prescribed upper antenna speed of 11 r.p.m. the contacts of high speed centrifugal switch 32 open, thereby causing triangular waveforms to be applied from Azimuth Synchronizing Circuit 34 through conductor 36, Start and Alarm circuit 10, and conductor 18 to the motor drive circuit 20. Simultaneously the 60 cycle source previously applied to the motor drive circuit is removed, thereby terminating the start cycle.

Unsynchronized azimuth pulses, when applied to Azimuth and North Protection Circuit 38 through conductor 2, are synchronized and applied through conductor 40 to Azimuth Synchronizing Circuit 34. Azimuth Synchronizing Circuit 34 is utilized to drive motor 28 in synchronism with the remote radar antenna by using synchronized azimuth pulses to control the motor speed. As will be shown and described in greater detail hereinafter, Azimuth Synchronizing Circuit 34 includes a triangular generator adapted to generate one triangular waveform cycle for each azimuth pulse applied thereto. Since motor 28 makes one complete revolution for each azimuth pulse, and since there are 256 azimuth pulses generated per antenna revolution, the azimuth pulse repetition frequency is 1,536 pulses per minute at the assumed antenna rotation rate of 6 r.p.m. This establishes the normal operating speed of motor 28 at 1,536 r.p.m.

Azimuth pulses are utilized in the present apparatus to perform varied functions. In addition to providing an instantaneous indication of the azimuth cordinate of a target within a resolution of 1.4°, they are utilized through the Azimuth Synchronizing Circuit 34 to drive motor 28 in synchronism with the remote radar antenna. Additional functions performed by azimuth pulses will be described hereinafter. Due to these varied applications, missing or excess azimuth pulses may result in loss of synchronism and loss of azimuth and range counts. To prevent these undesirable conditions from arising the present apparatus includes a Substitute Azimuth Generator and Spurious Protection Gate, shown as block 42, which is connected to the Azimuth and North Protection Circuit 38 through conductors 44, 46, 48 and 50. Substitute Azimuth Generator and Spurious Protection Gate 42 is utilized in the preferred embodiment to supply a predetermined time delay to enable each azimuth pulse to condition the circuit for the passage of the succeeding azimuth pulse. Thus the entry time for regular azimuth signals is limited to a comparatively short interval of the azimuth cycle. During the interium period, undesired spurious signals are inhibited from passing beyond the entry point to the system. In addition, Missing Azimuth Generator 42 functions to supply substitute azimuth pulses to perform practically all the functins of the regular azimuth pulse in the event that a regular azimuth pulse is not received within a predetermined time interval. The Azimuth and North Protection Circuit 38 operates in conjunction with Substitute Azimuth Generator and Spurious Protection Gate 42 to perform the above described functions. In addition, the Azimuth and North Protection Circuit 38 is connected through conductor 52 to Start and Alarm Circuit 10 to provide an alarm after a predetermined number of missing azimuth pulses have been detected within a relatively short interval determined by the parameters of the Start and Alarm Circuit. Conductors 54 and 56 connected from the Start and Alarm Circuit 10 to the Azimuth and North Protection Circuit 38 supply necessary potentials to permit operation of Azimuth and North Protection Circuit 38 and Substitute Azimuth Generator and Spurious Protection Gate 42. Gear reducing mechanism 58 connected to shaft 30 is a 32:1 gear reduction which enables the yoke 60 to make one revolution for each 8 revolutions of the remote radar antenna. Shaft 59 therefore runs at eight times yoke speed due to the 32:1 gear reduction. Yoke speed changing mechanism 62 provides the necessary correction to synchronize the North position of the yoke 60 with the North position of the remote radar antenna by either stopping or accelerating the yoke at double speed until synchronism is obtained. If the yoke and remote radar antenna are in synchronism, no change is produced by the yoke speed changing mechanism. The North Synchronizing Circuit 64 controls the yoke speed changing mechanism 62 through conductors 66, 68 and 70 depending on the relative occurrence between the radar North pulse on conductor 72 and the yoke North pulse on conductor 74. The time during which North Synchronizing Circuit 64 functions is controlled by the cam actuated North reset switch 76 which controls the Azimuth and North Protection Circuits through conductor 78 to limit operation of the North Synchronizing Circuit 64 for a period of approximately 10 degrees before and 5 degrees after a yoke North position. The switch limits operation of the North Synchronizing Circuit 64 to this 15 degrees period by controlling the anode potential applied through conductor 78 to the North Synchronizing Circuit.

The preferred embodiment herein described utilizes a rotating coil deflection system to obtain a polar presentation of the target area to be mapped. Since the range information occurs at a fixed rate, a fixed period linear sweep may be used, and since this range information is started from zero by each azimuth pulse, synchronized azimuth pulses may be used to trigger this sweep circuit. Accordingly, a synchronized azimuth pulse is applied from Azimuth and North Protection Circuit 38 through conductor 44 to sweep circuit 82, which generates a sawtooth waveform to drive deflection yoke 60 through conductor 84. Since sweep circuit 82 is triggered by a true azimuth pulse on conductor 44, it is evident that when an azimuth pulse is missing no sweep is made. Such a provision is necessary since the azimuth pulse is used to reset the range counter, as more fully described hereinafter, and failure to reset the range counter at normal azimuth time could produce a false range count and target display if a target was detected during a missing azimuth.

Before describing the various features associated with the display, a general description of the mapping technique employed in the subject apparatus will be given. Video mapping, as herein employed, is one way of preventing spurious signals or other undesired data, such as that resulting from cloud formations, mountains, etc. from being displayed. Conversely, the technique permits display of the reproduction of indications such as location of targets, routes of attack, reference numerals and the like. The present mapping approach utilizes the fact that most unwanted information appears on a PPI in recognizable areas, and therefore allows for area-wise masking of unwanted information. Masking is accomplished by applying a filter which is opaque to blue light over areas where mapping is desired. In the preferred embodiment herein described, mapping is performed by applying a rapid drying colored liquid, which is opaque to blue light, over the desired target area; the flow of filtered target information can then be controlled manually by a trained operator. Thus if a pulse represents non-useful target data, the CRT face is manually masked, preventing the utilization of the unwanted information. The PPI type display is on a P–7 phosphorus screen, so that intensification resulting from targets produces a blue light flash and a long persistent yellow afterglow on the screen of the cathode ray tube. The long persistent yellow afterglow of a target aids the operator in the selection of targets. This is especially useful when a target enters the radar coverage area in a field of clutter caused by clouds, noise or other forms of interference. If the general area of this field is masked by the operator, blue-flash target indications cannot filter through. If the condition requiring the masking is eliminated or its position transferred in space, such as might result, for example, from moving cloud formations, this condition becomes apparent to the operator, who can then remove that portion of the masking fluid, thus allowing any targets in that area to be detected on the next radar scan. In this way the operator is able to monitor changing conditions and to remove or add masking material to correspond to such conditions.

Target signals on conductor 4, comprising 0.1 microsecond pulses occurring in synchronism with range pulses, are connected to target display control 86. In response to each target signal, the target display control circuit generates an unblanking signal which is applied to control grid 88 of cathode ray tube 90 via conductor 92 to unblank the beam for a predetermined interval. In the preferred embodiment, an interval of approximately 43 microseconds is employed. If the target thereby displayed is not masked, the resulting blue flash on the screen is detected by the photo pickup 94 and applied through conductor 96 as a filtered target signal to control element 98. Control element 98 thereupon causes a reintensity signal of approximately 180 microseconds duration to be applied through conductor 100, target display control 86, and conductor 92 to control grid 88 of CRT90. Thus the present apparatus utilizes a double intensification system so that masked targets will appear at one intensity level and unmasked or filtered targets at a higher intensity level on the face of a cathode ray tube.

Unsynchronized range signals on conductor 6 are applied to control element 98 where they are synchronized with OD–2 timing pulses and applied through conductor 102 as synchronized range pulses to Azimuth and North Protection Circuit 38. OD-3 and OD-4 timing pulses are applied through conductors 104 and 106 to Azimuth and North Protection Circuit 38. Radar North pulses are applied from Azimuth and North Protection Circuit 38 through conductor 72 to reset azimuth counter 106. Azimuth pulses are applied from Azimuth and North Protection Circuit 38 through conductor 108 to step the azimuth counter 106 and to reset range counter 110. Unsynchronized range pulses on conductor 6 are synchronized by control element 98 and applied through conductor 112 to step the range counter 110 and to "prime" the delay register 114. Delay register 114 is a shift register and a pulse on the conductor 112 labeled Prime sets the first stage to the one state, all stages having previously been set to the zero state by a pulse on the conductor 16 labeled Reset.

The primary function of azimuth and range counter circuits 109 and 110, respectively, is the translation of azimuth and range signals into a binary representation of the polar coordinates of targets. The azimuth counter 109 serves to indicate the angular position of the remote radar antenna at any given instant. In the preferred embodiment, the radar scan of 360° is divided into 256 equally spaced azimuth segments, each segment representing approximately 1.4° of angular rotation. The azimuth counter 109 is reset in response to a North pulse on conductor 104, and as the remote radar antenna rotates approximately 1.4 degrees, an azimuth pulse is supplied to the azimuth counter 106. For each succeeding angular rotation of 1.4 degrees, a pulse is supplied to the azimuth counter 109. Thus the count held by the azimuth counter at any particular instant is a function of the angular position of the remote radar antenna. For each angular position that an azimuth pulse is generated by the remote radar, the range counter must count from zero through the maximum range of the remote radar. Accordingly, range pulses generated at the remote radar site are a function of time, which in turn is proportional to the distance of a target from the radar site. As previously noted, in the preferred embodiment range signals are 0.1 microsecond in duration which occur 625 microseconds apart. These 0.1 microsecond range pulses are converted by the control element 98 to pulses of sufficient duration to operate the range counter and delay register. The azimuth counter 109, range counter 110 and delay register 114 may be any suitable type, but preferably they are of the type shown and described in copending U.S. application Serial Number 502,634, now U.S. Patent 3,135,295, by Hawley K. Rising et al., filed on April 20, 1955. In the preferred embodiment, the azimuth counter 109 and range counter 110 contain the count at any instant in complement form, which is read from these counters on respective conductors 118 and 120 to associated azimuth read out register 122 and range read out register 124. These read out registers are preferably of the type described in the above identified Patent 3,131,295. The logic employed in the counters 106 and 110 is such that each time these counters are stepped, each counter must be shifted as many times as it has stages. Shift pulses on lines 126 and 128 serve to shift azimuth counter 106, while shift pulses on lines 130 and 132 serve to shift range counter 110. The two shift lines to each counter is a design consideration described in detail hereinafter. Shift pulses on line 134 serve to shift delay register 114. The number of shift pulses applied to these counters is controlled by delay register 114, which contains the same number of stages as counters 109 and 110. Delay register 114 maintains accurate control of the number of shift pulses supplied to the counters 106 and 110 by means of the prime operation, which sets the first stage to one prior to the application of shift pulses on conductors 126, 128, 130, 132 and 134. Thus when the one state has been shifted from the last stage of the delay register 114, a pulse is applied on conductor 136, labeled Stop Shift, to control element 98, which prevents further shifting operations.

Whenever a filtered target pulse appears on line 96, the control element 98 supplies shift pulses on conductor 138 to read out registers 122 and 124. In response to the shift pulses on conductor 138, the target data signals on conductors 118 and 120 serve to insert in the respective read out registers information contained in associated counters 109 and 110, respectively. Once the shifting operation is completed and the information in the azimuth and range counters 109 and 110 transferred to respective read out registers 122 and 124, control element 98 supplies a read out pulse on conductor 140 to cause the information in the read out registers 122 and 124 to be read out in parallel in complement form to respective gate circuits 142 and 144. It is pointed out that since the information is shifted serially from the counters 106 and 110 to the read out registers 122 and 124 in complement form, and since the parallel readout from the registers 122 and 124 is also in complement form, the true number is supplied to the gate circuits 142 and 144. The true number supplied to gate circuit 142 indicates an azimuth, while the true number supplied to gate circuit 144 indicates range, thereby defining the position of a target.

Control pulses OD–2 and OD–4 are applied to the control element 98 by the conductors 146 and 106, respectively. OD pulses from timing circuit 148 occur at a high rate of speed with respect to the other input pulses to the control element 98, thereby serving to synchronize the target, range and azimuth signals applied to control element 98 with the timing of the drum system described hereinafter. A pulse on conductor 150 labeled Drum Demand is applied to control element 98 whenever the drum system is ready to receive information. In response to the drum demand pulse the control element 98 will generate a Data Available pulse on conductor 152 if the read out registers contain information ready to be supplied. This Data Available pulse on line 152 is applied through a delay unit 154 to sample the gates 142 and 144. The data available pulse is also applied to the Write Status Circuit 156 for status control purposes more fully explained hereinafter.

From the above description it is seen that the function of actually furnishing target location data to the data processing machine is performed in the counter section. Polar target information from an associated radar is accepted by the counter section which maintains a cumulative count of azimuth and range data associated with each 360° radar scan. When a filtered target is indicated by a pulse on conductor 96, an accumulated count designating the location of the target is automatically made available to the data processing machine as more fully described hereinafter.

A magnetic drum 158 is provided with a timing channel and an index channel, each of which delivers through read heads 160 and 162 respectively their recorded signals to the previously mentioned timing circuit 148. As described in more detail in copending application Serial Number 494,982 filed by Robert R. Everett et al. on March 17, 1955, the timing channel has recorded thereon a succession of binary one signals in a closed loop, whereas the index channel has recorded thereon a succession of binary zero signals with a single binary one recorded at some arbitrary point in that channel. Each binary one signal recorded in the timing channel causes the timing circuit 148 to generate equidistantly spaced OD pulses, that is, an OD–1 pulse is produced on one conductor followed by an OD–2 pulse on another conductor, followed by an OD–3 pulse on another conductor, which is followed by an OD–4 pulse on still another conductor. The time space between these pulses is 2½ microseconds. OD–1 pulses as well as OD–2, OD–3 and OD–4 pulses have a repetition rate of 10 microseconds. While the frequency rate of the timing circuit heretofore described is 100 kc., this frequency is reduced through suitable means to 50 kc., producing a corresponding repetition rate of 20 microseconds. The binary one signal recorded in the index channel, when delivered through read head 162 to the timing circuit 148, causes that timing circuit to generate a .1 microsecond pulse on conductor 164 labeled OD Index. The OD timing and index pulses are applied to the Write Staus Circuit 156 and the OD–2 and the OD–4 pulses are also applied to the previously mentioned control element 98. The drum 158 is further provided with a CD Status Control channel and an OD Status Control Channel. The signals recorded in the OD Status Control Channel by write head 165 are delivered by way of a read head 166 to the Write Status Circuit 156. As will become apparent from the ensuing description a binary one signal is delivered from the OD Status Control Channel through the read head 166 to the Write Status Circuit 156 provided that the next drum register into which data is to be written already contains useful information, whereas a binary zero signal is delivered from the OD Status Control Channel to Write Status Circuit 156 provided the next drum register into which information is to written is empty. The Write Status Circuit 156 in response to a binary zero signal from the OD Status Control Channel causes a pulse to be delivered through conductor 150, labeled Drum Demand to Control Element 98. In response to this signal, the control element 98 causes the contents of the read out registers 122 and 124, if full, to be delivered to gates 142 and 144. When those signals are delivered, a pulse is generated by the control element 98 and delivered to the conductor 152 labeled Data Available. This data available pulse through a suitable delay unit 154 causes the gate circuits 142 and 144 to be sampled, and the data contained in the gate circuits 142 and 144 to be applied to a write circuit 168 by way of the conductors of cables 170 and 172. This data available pulse produced on conductor 152 is also applied to the Write Status Circuit 156. In response to this data available pulse, Write Status Circuit 156 causes a pulse to be delivered through a conductor 174 labeled Write to write circuit 168, and a Write a One signal to be delivered to a write head 176, thereby causing a binary one signal to be recorded in the CD Status Control Channel. The write signal on conductor 174, which occurs at OD–3 time, followed by a pulse on the conductor 175 labeled OD–3+1.7 causes the signals stored in the write circuit 168 to be delivered to a set of write heads 178, thereby causing the data which was read from the read out registers 122 and 124 to be recorded in the registers of drum 158. As more fully described in copending application Serial Number 494,982, in the event that the Write Status Circuit 156 receives a binary zero signal from the OD Status Control Channel indicating that the next drum register available to be written into is empty, and no signal is received from the conductor labeled Data Available, the Write Status Circuit 156 causes a Write a Zero signal to be delivered to the write head 176, thereby causing a binary zero to be recorded in the CD Status Control Channel, indicating that the register corresponding thereto is empty. In the event that a binary one signal is received from the OD Status Control Channel, the Write Status Circuit 156 causes a Write a One signal to be delivered to the write head 176, and this recorded binary one signal in the CD Status Control Channel indicates that the register corresponding thereto is full. Signals recorded in the CD Status Control Channel are read by read head 180 and applied to a Read Status Circuit 182. The Read Status Circuit 182 further receives a control signal from a data processing machine 184 by way of a conductor 186 labeled Read. When the data processing machine 184 desires to receive data from the drum 158, it causes a positive potential to be delivered by way of the conductor 186 to the Read Status Circuit 182. Assuming that the data processing machine 184 does not desire to receive data from the drum 158, it produces a negative potential on the conductor 186, thereby causing the Read Status Circuit 182 to operate in the following manner:

(1) If a binary zero signal is received from the CD Status Control Channel through the read head 180, Read Status Circuit 182 causes a binary zero to be recorded in the OD Status Control Channel; (2) in the event a binary one signal is received from the CD Status Control Channel through the read head 180, the Read Status Circuit 182 causes a binary one to be recorded in the OD Status Control Channel. The above operation could be summarized by saying that when the Read Status Circuit 182 is not instructed to read, it merely causes the status signals in the CD Status Control Channel to be recorded on the OD Status Control Channel. Assuming that the data processing machine 184 desires to receive data from the drum 158, it produces a positive potential on the conductor 186 labeled Read, in response to which the Read Status Circuit 182 operates in the following manner:

(1) If a binary one signal is received from the CD Status Control Channel through the read head 180, the Read Status Circuit 182 produces a positive .1 microsecond pulse on the conductor 188 labeled Read Sample. This pulse on conductor 188 causes a set of read circuits and sample gates 190 to deliver the signals read from drum 158 by a set of readheads 192 to be delivered to a temporary storage register 194. The data processing machine 184 prior to intructing the Read State Circuit 182 to read causes a .1 microsecond pulse to be delivered to a conductor 196 labeled Clear, thereby setting each stage of temporary storage register 194 to the binary zero state. When in the binary zero state, the temporary storage register 194 is ready to receive data. When the Read Status Circuit 182 produces a pulse on the conductor 188 thereby causing the signals read from the drum register to be placed in the temporary storage register 194 as above described, this pulse is also applied to the data processing machine 184, thereby informing the data processing machine 184 that the temporary storage register 194 contains data. Data processing machine 184 thereupon delivers a pulse to a conductor 198, which when received by the temporary storage register 194 causes the data stored therein to be delivered by way of the conductors of a cable 200 to the data processing machine 184.

(2) If a binary zero signal is received by the Read Status Circuit 182 from the CD Status Control Channel, then the Read Status Circuit 182 merely causes a Write a Zero signal to be recorded in the OD Status Control Channel, indicating that the register is still empty.

*Azimuth and North protection circuit*

Figure 2:
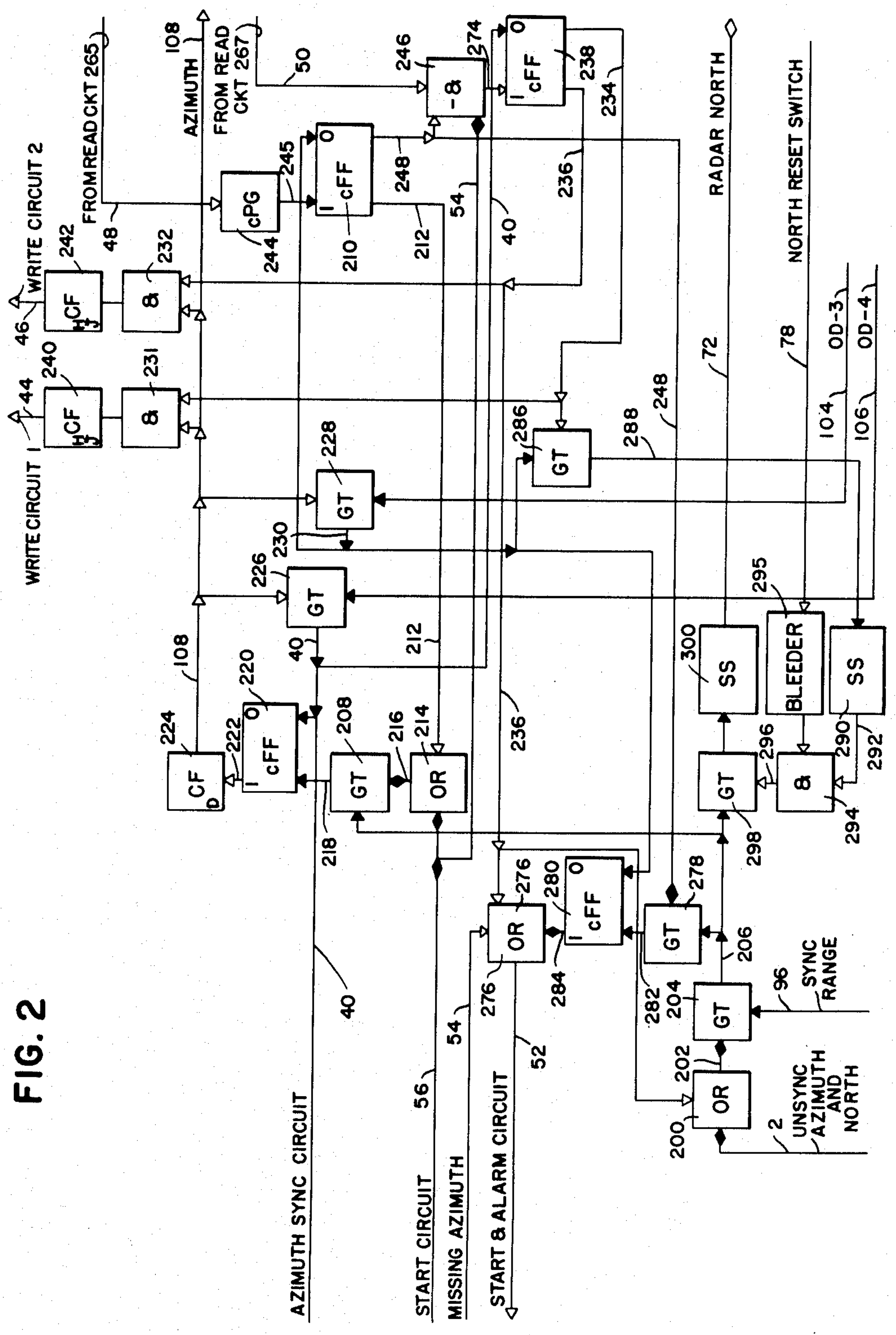
FIG. 2 illustrates in block schematic or logical form the Azimuth and North Protection Circuit identified as block 38 in FIG. 1*a*.

*Referring to FIG. 2,* there is illustrated in logical form the Azimuth and North Protection Circuit identified as block 38 in FIG. 1. Incoming unsynchronized azimuth pulses on conductor 2 are applied through OR circuit 200 and conductor 202 to condition gate circuit 204. The pulses on conductor 96 which sample gate circuit 204 are synchronized range pulses from control element 98 which occur at a particular OD–2 time. When a synchronized range signal on conductor 96 samples gate 204 when an azimuth signal is present on conductor 202, gate 204 generates a .1 microsecond pulse which is applied through conductor 206 to sample gate circuit 208. The output signal from gate circuit 204 may therefore be considered as a synchronized azimuth signal. Since the operation of gate circuit 204 is practically instantaneous, gate circuit 208, sampled by the output of gate circuit 204, is sampled at approximately OD–2 time. During normal operation as defined hereinafter, i.e., after completion of the start cycle, gate circuit 208 is conditioned at approximately azimuth time by the binary one output from flip-flop 210, which is applied through conductor 212, OR circuit 214 and conductor 216. Therefore when gate 208 is sampled by the synchronized azimuth signal on conductor 206, a positive pulse is generated and applied through conductor 218 to set flip-flop 220 in the one state, which thereupon generates a positive D.C. signal which is applied through conductor 222 and cathode follower 224 to conductor 108 labeled Azimuth. The signal on conductor 108 is applied to condition gate circuits 226 and 228. At OD–3 time, gate 228 is sampled by an OD–3 timing pulse on conductor 104, thereby generating a pulse which is applied through conductors 230 to reset flip-flop 210 to the binary zero state, thereby removing the conditioning potential on conductor 216 applied from the binary one output of flip-flop 210 to gate circuit 208 through the above described circuit. At OD–4 time, an OD–4 timing pulse is applied through conductor 106 to sample gate circuit 226, resulting in a positive signal being generated on conductor 40 which is applied to reset flip-flop 220 in addition to being applied to Azimuth Synchronizing Circuit 34 (FIG. 1*a*). Since flip-flop 220 was set at approximately OD–2 time and reset at OD–4 time, the output signal on conductor 222 is approximately 5 microseconds in duration, i.e., the interval between OD–2 and OD–4 time. Flip-flop 220 thereupon remains reset until the next azimuth pulse is received.

From the preceding description, it is apparent that an azimuth pulse, after passing gate circuit 208, will cause the conditioning potential on conductor 216 to be removed from gate circuit 208 after approximately 2.5$\mu$ secs. by the OD–3 pulse and thereby effectively inhibit any succeeding pulses on conductor 206 until the conditioning potential is restored on conductor 216 for the next azimuth signal. Thus, even though a spurious signal on conductor 2 conditions gate 204 to generate a pulse on conductor 206, when a synchronized range pulse is received on conductor 96, it will be inhibited from passing through the Azimuth and North Protection Circuit by gate circuit 208.

The output of cathode follower 224 is also applied through conductor 108 to AND circuits 231 and 232. During normal operation, a positive signal is applied from Substitute Azimuth Generator and Spurious Protection Gate 42 (FIG. 1*a*) via conductor 48 to pulse generator 244, which in response thereto generates a pulse to set flip-flop 210 to the binary one condition, thereby providing the conditioning potential on conductor 216. The time at which this occurs is more fully described hereinafter. In the event that an azimuth pulse is missing, no signal is applied to conductor 48 but a negative signal is applied through conductor 50 to negative AND circuit 246. Under the missing azimuth condition, a negative potential is also applied to the input 248 and a zero potential applied to input 154 of negative AND circuit 246, so that flip-flop 238 is set to the binary one state by the output from negative AND circuit 246. While the remaining flip-flops utilize a positive pulse which is inverted at the input of the circuit, flip-flop 238 utilizes an RC input whereby a negative signal is applied directly from negative AND circuit 246 to the binary one input conductor 274. Under this condition, AND circuit 232 is conditioned by the binary one output of flip-flop 238 on conductor 236. Since AND circuits 231 and 232 are conditioned through opposite outputs 234 and 236 respectively of flip-flop 238, it is apparent that one of these AND circuits will be conditioned to pass pulses at any given interval, depending on whether or not an azimuth pulse is received. During normal operation, i.e., no missing azimuth pulses, AND circuit 231 is conditioned by a positive D.C. potential on conductor 234 from flip-flop 102, so that the signal applied through conductor 108 passes through AND circuit 231, cathode follower 240, thence through conductor 44 to Substitute Azimuth Generator identified as block 42 in FIG. 1*a* and to the Sweep Circuit identified as block 82 in FIG. 1*a*. If AND circuit 232 is conditioned, the signal on conductor 108 passes through AND circuit 232, cathode follower 242 and conductor 46 to Substitute Azimuth Generator 42. As will be described more fully hereinafter, Substitute Azimuth Generator 42 causes a positive pulse to be applied to conductors 48 and 50 if an azimuth pulse is received, or a negative pulse to be applied to conductor 50 if an azimuth pulse is missing. These potentials, in turn, determine whether the pulse on conductor 108 goes through conductor 44 or 46 to Substitute Azimuth Generator 42.

During normal operation, a signal is applied from conductor 108 through AND circuit 231 and cathode follower 240 and conductor 44 to Substitute Azimuth Generator and Spurious Protection Gate 42. After about 90% of an azimuth period, i.e., the interval between azimuth pulses, a signal on conductor 48 causes flip-flop 210 to provide the conditioning potential to gate circuit 208 to perimt the succeeding azimuth pulse to be gated through. In this manner regular azimuth pulses on conductor 2 are enabled to pass to conductor 108 to provide the previously described functions.

As previously described, the functions provided by the azimuth pulses are such that in the event that no azimuth pulse is received during the normal azimuth time, a substitute azimuth pulse must be generated by the present apparatus. For a complete understanding of the method of generating a substitute azimuth pulse reference will be made to FIG. 3 which illustrates in detail the Substitute Azimuth Generator and Spurious Protection Gate identified as block 42 in FIG. 1*a*.

Essentially the Substitute Azimuth Generator is a single track cylindrical drum 250 having the ability to store data in magnetic form. This drum is rotated by the azimuth motor 28 through shaft 30 and a 1.0 to 0.8 gearing mechanism 252, 254, and therefore rotates at 80% of the motor speed. Since one revolution of the motor corresponds to one azimuth cycle, one 360 degree azimuth cycle corresponds to 288 degrees of drum rotation. Input conductors 44 and 46 from the Azimuth and North Protection Circuit are connected through write circuits 256 and 258 to write heads 260 and 262 respectively. The drum also includes read heads 264 and 266 which are connected through read circuits 265 and 267 to conductors 48 and 50 respectively. An erase head 272 is positioned between read head 266 and write head 260. Generally speaking, during normal operation, the azimuth pulse on conductor 108 is applied through conductor 44 and write circuit 256 to write head 260, thereby causing the signal to be recorded on the drum 250. As the drum rotates, this signal is read by read heads 264 and 266 and applied through read circuits 265 and 267 to conductors 48 and 50 respectively. As previously described with reference to FIG. 2, the read signal on conductor 48 causes gate circuit 208 to be conditioned to pass the succeeding azimuth pulse on conductor 206. When the succeeding azimuth pulse is gated through gate 208 and applied to conductor 108, gate circuit 228 is conditioned and sampled at OD–3 time. The resulting pulse on conductor 230 causes flip-flop 210 to be reset to the binary zero state and thereby apply a positive potential through conductor 248 to negative AND circuit 246. Thus when the recorded azimuth signal is read by read head 266 and applied through read circuit 270 as a negative signal on conductor 50, it is inhibited by the negative AND circuit due to the positive potential on input conductor 248 of negative AND circuit 246. Negative AND circuit 246 is a logical circuit requiring all inputs to be negative to obtain a negative output. Since no output is obtained during normal operation the above described sequence with respect to drum 250 is repeated for each azimuth cycle. As is evident from the preceding description, substitute azimuth generator and spurious protection gate 42 performs a dual function. The function whereby each azimuth pulse is delayed for the required time to condition gate circuit 208 to pass the succeeding azimuth pulse is the spurious protection gate which functions as above described. The manner in which substitute azimuth pulses are provided when a regular azimuth pulse is missing will now be described in detail with reference to FIGS. 2 and 3.

Assuming that no azimuth signal is received on conductor 2 at the expected time, a previously recorded signal is read through conductor 48 to set flip-flop 210 in the binary one state and condition gate 208 through conductor 216. However, due to the absence of the incoming azimuth signal no signal is generated by gate 208 and applied to conductor 108. Due to the absence of the signal on conductor 108, gate 228 is not conditioned and flip-flop 210 is therefore not set in the binary one state at OD–3 time by the output from gate 228. When the previously recorded signal passes under read head 266, a negative signal is generated by read circuit 267 and applied through conductor 50 to negative AND circuit 246. Input conductor 248 of negative AND circuit 246 has a negative potential thereon since flip-flop 210 is set in the binary one state, while input conductor 54 of negative AND circuit 246 has a zero potential from Start and Alarm Circuit 10 (FIG. 1*a*) thereon during normal operation. It should be noted that input conductor 54 has a positive potential thereon during the start cycle to prevent read out of any data recorded during the start cycle by negative AND circuit 246. Since none of the inputs of negative AND circuit 246 are positive, the resultant negative potential output from AND circuit 246 is applied through conductor 274 to set flip-flop 248 in the binary one state. When flip-flop 238 is set in the binary one state, the resulting positive potential on conductor 236 conditions AND circuit 232, and in addition is applied to OR circuits 200 and 276. The resulting output from OR circuit 200 is applied through conductor 202 to condition gate circuit 204. When gate circuit 204 is sampled by the succeeding synchronized range pulse on conductor 96, the resulting output on conductor 206 is gated through gate circuit 208, which has remained conditioned, to conductor 108. Since AND circuit 232 has been conditioned by the potential on conductor 236 as above described, the signal on conductor 108 is applied through AND circuit 232 and its associated cathode follower 242 through conductor 46 and write circuit 258 to write head 262. Since the synchronized range pulse used to sample gate 204 occurs at OD–2 time, the duration of the output pulse from flip-flop 220 is limited to 5 microseconds by the OD–4 pulse in the manner previously described.

Thus when the expected azimuth pulse is not received, a substitute azimuth pulse is generated and recorded on drum 250 by write head 262. Write head 262 is physically positioned 43.2 electrical degrees closer to read head 264 than is write head 260. Thus, even though the substitute azimuth pulse is recorded 403.2 electrical degrees after the last received azimuth pulse, or 43.2 electrical degrees late, it will be read by read head 264 at the same time as though it had been written by write head 260 at 360 electrical degrees. Therefore, the time at which the signal is recorded by write head 262 corresponds to the time at which the signal would have passed under write head 262 had it been recorded by write head 260 during normal operation. In other words, the signal is recorded by write head 262 on the same spot on the drum where it would normally have been recorded by write head 260. Thus when the missing azimuth pulse is detected, a substitute azimuth pulse is automatically provided to be recorded by write head 262 and the sequence of operation thereafter with respect to the Substitute Azimuth Generator and the Azimuth and North Protection Circuit is identical to that which would have occurred had the azimuth pulse been recorded by write head 260 in the conventional manner.

Due to the relatively slow speed of operation of magnetic drum 250 as compared to magnetic storage drums, special drum read and write circuits were required which are described hereinafter. The drum employed in the preferred embodiment is a D.C. biased single track drum 8 inches in diameter and ⅜ of an inch wide. The read and write heads consist of wire wound around permeable cores and are spaced approximately 0.001 to 0.002 inch from the drum surface. Erase head 272 is a conventional permanent magnet type of drum eraser.

While it is desirable to generate substitute azimuth pulses for pulses which might be missing at irregular intervals, the substitute azimuth pulse circuit described above would continuously supply substitute pulses even though no azimuth pulses were being received at the Mapper input. To preclude operation under this condition, the output conductor 236 of flip-flop 238 is also applied to OR circuit 276, the output of which OR circuit is connected to Start and Alarm Circuit 10 (FIG. 1). This circuit provides for an alarm should a number of azimuth signals be missing within a predetermined interval. Details of the alarm system are more fully shown and described with reference to the Start and Alarm Circuit shown in U.S. Patent 3,072,818.

The preferred embodiment of Azimuth and North Protection Circuit herein described also includes means for actuating an Alarm Circuit if the yoke 60 (FIG. 1) is rotating at a subharmonic speed of the radar antenna. During the starting operation, the motor reaches a speed above its normal maximum operating speed before the 60 cycle source is removed. Thereafter the motor speed decreases until it becomes synchronized with the radar antenna. However, it is possible for the motor speed to fall below the speed of the radar antenna and synchronize in at some subharmonic speed thereof. For example, assuming the radar antenna is rotating at 6 r.p.m., it would be possible for the yoke to rotate at 3 r.p.m. Under this condition, every other azimuth pulse from the radar would perform the normal azimuth functions heretofore described and every second pulse would be rejected.

To recognize this condition if it should occur, the circuit comprising the gate 278, flip-flop 280 and OR circuit 276 is provided to actuate the Start and Alarm Circuit. This circuit operates in the following manner:

Gate 208 is conditioned by a binary one output from flip-flop 210 applied through OR circuit 214 when flip-flop 210 is set in the binary one state for a relatively brief interval during the expected azimuth time. Shortly after the azimuth pulse has arrived however, flip-flop 210 is reset to the binary zero state by the output from gate circuit 228 which is sampled by an OD–3 pulse on conductor 104. When flip-flop 210 is reset to the binary zero state, the resultant positive potential on conductor 248 conditions gate circuit 278. Since gates 208 and 278 are conditioned by opposite outputs of flip-flop 210, it is apparent that gate 278 is conditioned for almost the entire azimuth cycle except for the relatively small interval during which gate 208 is conditioned. Thus if a subharmonic or spurious azimuth pulse is received on input conductor 2, it will condition gate 204 which, when sampled by the next synchronized range pulse on conductor 96, will generate a pulse on conductor 206 to sample gate 278. Since gate 278 is conditioned, a positive pulse is applied through conductor 282 to set flip-flop 280 in the binary one state. The resulting positive output on conductor 284 is applied through OR circuit 276 to conductor 52. As will be described in greater detail hereinafter, a succession of these pulses on conductor 52 within a predetermined interval serves to actuate an alarm circuit.

From the above description it is apparent that subharmonic pulses or excessive spurious or substitute azimuth signals result in the alarm circuit being actuated by positive signals being applied to separate inputs of OR circuit 276. The remaining input conductor 54 to the OR circuit is utilized to prevent an alarm condition during the starting cycle by inhibiting OR circuit 276 from pulsing. This is done by applying a positive potential to conductor 54 during the start cycle.

To provide an accurate PPI type display on the cathode ray tube 90, it is necessary to synchronize the PPI yoke North with the radar North signal on each scan of the radar antenna. To obtain this synchronization, it is necessary to compare the radar North signal with the yoke North signal generated by the PPI and then make the necessary correction required to synchronize the two positions. In order to compare the two signals, it is first necessary to separate radar North signals from the incoming azimuth signals. As previously described, a radar North signal is indicated by two closely spaced azimuth signals on input conductor 2, the two signals being separated by one range count, or approximately 625 microseconds. The second of the two pulses must be separated to perform its assigned functions.

During normal operation, i.e., no missing azimuth pulses, flip-flop 238 remains reset to the binary zero state, so that gate circuit 286 is conditioned by the positive D.C. level applied through its output conductor 234. From the previous description it will be apparent that gate circuit 286 is not conditioned when a substitute pulse is being supplied in lieu of a regular azimuth pulse, since flip-flop 238 is set to the binary one state. At OD–3 time, the pulse generated by gate 228 is applied through conductor 230 to sample gate 286. Since gate 286 is conditioned, the resulting generated pulse is applied through conductor 288 to multivibrator 290. Multivibrator 290 may be any conventional single-shot multivibrator adapted to generate a substantially rectangular wave in response to a 0.1 microsecond pulse applied thereto, and is preferably of the type shown in copending application Serial Number 474,346, "Monostable Multivibrator," filed by Wililam L. Jackman on December 10, 1954. Multivibrator 290 generates a long pulse which is applied through conductor 292 to AND circuit 294. The second input to AND circiut 294 is a D.C. signal applied through North reset cam switch 76 (FIG. 1*a*) via conductor 78 and a bleeder 295. North reset switch 76 is only closed for a time interval beginning approximately 6 azimuth positions, representing approximately 10 degrees of azimuth sweep, before the yoke North signal and remains closed for approximately 5 degrees after the yoke North pulse occurs. Assuming positive potentials on conductors 78 and 292 of AND circuit 294, the resultant positive output is applied through conductor 296 to condition gate circuit 298. The timing of the above circuit is such that gate 298 is conditioned at the time the second azimuth pulse indicating North, which is approximately 625$\mu$ secs. after the regular azimuth pulses, is received on conductor 202. After gate 298 has been sampled by a pulse on conductor 206, the positive potential output from the multivibrator 290 terminates before the next range pulse arrives, and thereby inhibits gate 298 from passing any additional pulses on conductor 77 which would produce a false North indication. The above described circuitry constitutes the North Protection Circuit. From this description it will be readily appreciated that the time relationship between the above recited sequence of events is such that gate 298 is conditioned only at the time that the second closely spaced azimuth pulse occurs. When gate 298 is sampled in the above described manner, the resulting 0.1 microsecond signal is applied to single-shot multivibrator 300. Multivibrator 300 essentially is the same type as multivibrator 290, and functions as a pulse stretcher to lengthen the .1 microsecond pulse generated by gate 298 to 5 microseconds to trigger the North Synchronizing Circuit, identified as block 64 in FIG. 1, through conductor 72. The output from single-shot multivibrator 300 is also applied through conductor 72 to reset the azimuth counter.

From the above description it is readily appreciated that the function of the North and Azimuth Protection Circuit is to guard against the loss of incoming azimuth pulses, to prevent spurious pulses from being used as true azimuth pulses and to separate the North from the incoming azimuth signals. As described hereinafter, the function of the North signal is to maintain synchronization between the PPI yoke and radar antenna and to reset the azimuth counters.

*Yoke speed changing mechanism*

Referring now to FIG. 4*a*, there is illustrated in schematic form the Yoke Speed Changing Mechanism shown as block 62 in FIG. 1*a* together with the remaining elements associated with the mechanical assembly through which the yoke 60 is driven by motor 28. This assembly includes components which were deleted from FIG. 1 for ease of illustration. While the present system is designed to operate over a radar antenna range of 4 to 10 r.p.m., the ensuing description will be directed toward the heretofore assumed antenna speed of 6 r.p.m.

The function of the mechanical assembly illustrated in FIG. 8*a* is to maintain the yoke 60 in synchronization with the North position of the radar antenna. To accomplish this, the output shaft 63 of the mechanical assembly must be able to produce three different rates of speed, the particular rate being determined by the correction to be made, while maintaining the speed of the input shaft 59 constant. This is accomplished in the following manner:

Referring specifically to FIG. 4*a*, the azimuth drive motor 28 and its output shaft 30 are driven at 1536 revolutions per minute under the assumed 6 r.p.m. antenna speed. The shaft 30 has a gear 252 mounted thereon which meshes with gear 254 to drive the azimuth protection drum 250 as previously described. Gear 254 also meshes with gears 1110 and 1112, the former of which is connected through shaft 1114 to centrifugal switch 1116. Centrifugal switch 1116 includes the contacts of low and high speed centrifugal switches shown as blocks 14 and 32 in FIG. 1*a* mounted in a single housing. Gear 1112 is connected through shaft 43 to mechanical gear assembly 58. Mechanical gear assembly 58 comprises two 4:1 reduction units which reduce the speed on its output shaft 59 to 96 r.p.m. Shaft 59 functions to drive gear 1118, which is connected to end gears 1120 and 1122 of differential units 1106 and 1108 respectively, at a uniform rate. As is shown in greater detail in FIG. 8*c* and described in reference thereto, a differential unit consists of two end gears and an output shaft. The speed of the output shaft of a differential unit can be determined from the equation $$\frac{X+Y}{2}=Z$$

wherein $X+Y$ is the algebraic sum of the speeds of the respective end gears of the differential unit and wherein Z is the speed of the output shaft. Initially it will be assumed that the direction of rotation of the end gears of differential 1106 will be the direction indicated by the associated arrows.

In order to obtain the required speed correction in the present apparatus, output shaft 1124 of differential unit 106 must be controlled to rotate at speeds of 48, 96 or 0 r.p.m. under the normal speed correction, double speed correction or stop correction respectively. End gear 1120 under all conditions will rotate in the direction indicated at a constant speed of 96 r.p.m. The desired outputs from differential 1106 are obtained by controlling either the speed or direction of rotation of end gear 1121 of differential 1106. The present embodiment utilizes three electromagnetic brakes which are represented schematically in FIG. 8*a* by armature discs 1128, 1130 and 1132, which in turn are associated with the normal speed brake 1100, the stop speed brake 102 and double speed brake 1104 respectively, described hereinafter with reference to FIG. 8*b*. As noted heretofore, only one of these brakes which are controlled by conductors 66, 68 and 70 can be energized at any one time, the particular brake energized being determined by the correction to be made. Under normal speed operation, the normal speed brake is energized, while under stop and double speed correction, the associated stop or double speed brake will be energized.

Assuming in the first instance that the yoke and radar antenna are in synchronism, thereby requiring the aforesaid normal speed operation, armature disc 1128 will be energized, thereby preventing shaft 1134 from rotating. Shaft 1134 controls the rotation of gear 1136 which in turn is connected to end gear 1121 of differential 1106 through gear 1138. Since gear 1136 is prevented from rotating by the action of the normal speed brake, end gear 1121 is also prevented from rotating and the rotational speed of output shaft 1124 from the preceding equation is equal to $$\frac{96+0}{2}$$

or 48 r.p.m. 48 r.p.m. in the exemplified embodiment is the synchronous speed of shaft 1124.

Under the condition where the yoke North pulse occurs after the radar North pulse within the previously defined limits, the output shaft 1124 is rotated at double speed for the required time interval to permit the yoke to "catch up" with the radar antenna. Under this correction, the double speed brake 1104 is energized, and its associated armature disc 1132 prevents shaft 1140 from rotating. End gear 1122 of differential 1108 is driven under all conditions by gear 1118 at a constant speed of 96 r.p.m. in the direction indicated by the arrow. From the preceding equation, it is apparent that end gear 1123 must be driven at the same speed but in the opposite direction as end gear 1122 in order to obtain a zero output on shaft 1140. Accordingly, end gear 1123 is driven in the opposite direction to that indicated by the arrowhead at the same speed as end gear 1122, or 96 r.p.m. As the end gear 1123 rotates in the opposite direction to that indicated by the arrowhead, the gears 1136 and 1138 cause the end gear 1121 of differential unit 1106 to rotate in the direction indicated by its arrowhead at a speed of 96 r.p.m. From the preceding equation therefore, the speed on output shaft 1124 is equal to $$\frac{96+96}{2}$$

or 96 r.p.m., corresponding to double speed in the exemplified embodiment.

When the yoke North pulse precedes the radar North pulse, a stop correction is performed to stop the yoke until the radar North occurs. Under the stop condition, stop brake 1102 is energized, and its associated armature disc 1130 prevents shaft 1124 from rotating. As is apparent from the preceding equation, end gear 1121 is driven in the opposite direction and at the same speed as end gear 1120. The stop correction is performed whenever the yoke North pulse precedes the radar North pulse. Shaft 1124 remains in this condition until the succeeding radar North pulse causes it to start out in synchronism with the radar antenna.

Another element included in the yoke speed changing mechanism is the yoke North pulse generator which generates the yoke North pulse on conductor 74 to initiate the necessary correction. The yoke North pulse generator comprises a light source 1142, contra-rotational gear 1144 and disc 1146 and photo pickup 1148. Due to the 8:1 speed reduction occurring between gears 1152 and 1144, shaft 1124 is rotating at 8 times the speed of the yoke 60. Disc 1146, which is rotatably mounted on shaft 1134, is driven through idler gear 1150 to rotate at the same speed as shaft 1124. Gear 1144, on the other hand, is fixed to shaft 63. As shown the gear 1144 and disc 1126 rotate in opposite directions. The yoke North position will be indicated once each revolution of gear 1144 when the associated slots are aligned between the light source 1142 and the photo pickup 1148. This condition of alignment occurs only once for each rotation of the yoke irrespective of the speed of rotation. The resulting pulse generated by photo pickup 148 is then applied through conductor 74 to the North Synchronizing Circuit 64 (FIG. 1*a*). Since output shaft 63 is pinned to gear 1144, it therefore rotates at ⅛ the speed of shaft 1124. Yoke 60 is connected to shaft 63 through a gear train comprising gears 1153 through 1156, universal joint 1158, shaft 1159 and gear 1160. Yoke 60 is therefore enabled to rotate at the same speed as output shaft 63. Cam 1157 which actuates the North Reset Switch shown as block 76 in FIG. 1*a* and lamp relay reset cam 1161 are mounted on output shaft 63.

In order to illustrate the electrical controls used to energize the yoke speed changing mechanism, reference is made to FIG. 4*b*. The assembly as shown comprises the normal speed brake 1100, stop brake 1102 and double speed brake 1104 which are energized by conductors 66, 68 or 70 respectively. Brakes 1100, 1102 and 1104 are shown schematically as having armatures 1162, 1164 and 1166 respectively. Input and output shafts, and differential units are interconnected and function in the manner heretofore described in connection with FIG. 8*a*. When the yoke North pulse generator 1168 generates a pulse on conductor 74, the North Synchronizing Circuit 64 will apply a 48 volt potential to conductor 66, 68 or 70 depending on the relative occurrence of the yoke North pulse with respect to the occurrence of the radar North pulse, that is, if the yoke is lagging the North pulse, the double speed brake 1104 is energized; if the yoke pulse is in synchronism with the radar North pulse, the normal speed brake 1100 is energized; if the yoke pulse precedes the radar North pulse, the stop brake 1102 is energized. The manner in which the determination of which brake to energize is made, as well as the length of time the brake is maintained energized has been described in detail with reference to the North Synchronizing Circuit. When a positive 48 volt potential is applied from the North Synchronizing Circuit to conductor 68 or 70 associated with the stop or double speed brakes 1102 or 1104, the circuit through armature 1164 or 1166 is completed through conductor 1170 and lamp 1172 to a negative 48 volt terminal 1174. The circuit through which armature 1162 of normal speed brake 1100 is energized is completed from conductor 66 through armature 1162, through conductor 1176 and normal lamp 1178 to negative 48 volt terminal 1179. When relay 1180 is deenergized, standby lamp 1181 is connected in parallel with normal lamp 1178. Thus it is seen that each brake circuit has a lamp associated therewith.

For the satisfactory operation of the yoke speed changing mechanism, it is necessary that normal speed brake 1100, stop brake 1102 and double speed brake 1104 operate as rapidly as possible after being energized. This is done by initially applying a surge of current higher than the normal operating current through the brakes. However, after operation of the brakes has been initiated, normal operating current must be supplied. Since lamp filaments are characterized by low resistance when cool and higher resistance when heated, the above specified current variation is obtained by utilizing the lamp in series with each brake. As noted above, lamp 1172 is in series with stop brake 1102 and double speed brake 1104, and normal lamp 1178 is in series with normal speed brake 1100. When relay 1180 is deenergized, a standby lamp 1181 is in parallel with normal lamp 1178.

During synchronous operation, normal speed brake 1100 is energized. At approximately 5 degrees after yoke North time, the lamp reset cam 1196 completes a circuit from —48 volt terminal 1179 through reset cam 1196, resistor 1182, relay 1180, conductor 66, contacts 954 and 952 of relay 950 (FIG. 7*b*), conductor 948, contacts 946 and 944 of relay 934 to positive 48 volt terminal 942. When energized, relay 1180 is maintained energized by a holding circuit from negative 48 volt terminal 1179, contacts 1183 and 1184 of relay 1180, resistor 1182 and relay 1180 to the above described positive 48 volt source 942. If the yoke 60 is required to rotate at double speed, relay 950 is deenergized as previously described, thereby opening its contacts 952 and 954 through which relay 1146 is energized. If the yoke is required to stop, relay 934 is de-energized, thereby opening its contacts 946 and 944 resulting in deenergizing relay 1180. Thus it is seen that relay 1180 is de-energized during stop or double speed correction.

Relay 1180 when deenergized, opens its contacts 1183 and 1184 and closes its contacts 1183 and 1185. Under this condition, standby lamp 1181 is connected in parallel with normal lamp 1178, thereby insuring a cool filament and a corresponding low resistance path to normal speed brake 1100 should normal speed correction, that is, from stop or double speed to normal speed, be accomplished before normal lamp 1178 becomes sufficiently cool to provide the necessary low resistance path. Thus the function of relay 1180 is to provide a cold cathode for the normal speed brake after the time when speed correction from double speed or stop to normal speed has been accomplished. Lamp reset cam 1196 makes momentary contact after the normal speed brake 1100 is again energized. Thus relay 1180 is energized and remains energized through the holding circuit above described. As previously noted, lamp 1172 is in series with the stop and double speed brake circuits and performs a similar function during a stop or double speed operation of the yoke as that performed by the above described lamps 1178 and 1181. No standby lamp is required for lamp 1172, since lamp 1172 always has time to cool before the next use due to the relatively short correction interval.

Referring now to FIG. 4*c*, there is illustrated in detail a mechanical differential of the type shown as 1106 in FIG. 8*a* and generally described with reference thereto. As is well known in the art, a differential is an arrangement of gears having two input gears and an output shaft. The output shaft rotates at a speed which is half the algebraic sum of the two input gear rotations. Referring specifically to FIG. 8*c*, a gear assembly comprising an end gear 1120 fixed to a bevel gear 1188 is rotatably mounted on the shaft 1124 and retained against longitudinal movement in one direction by a collar 1189 pinned to the shaft 1124. A similar gear assembly comprising gears 1121 and 1190 is retained on the shaft 1124 by a collar 1191. An arm 1192 is fixed to the shaft 1124 by a pin 1193 and carries a stud 1194 upon which is rotatably mounted a bevel gear 1195 meshing with the bevel gears 1189 and 1190. If one gear assembly, for example, 1121, 1190, is locked against rotation and the other, 1120, 1188, is rotated, the gear 1195 will be rotated by the driven gear assembly. Since the gear 1195 also meshes with a gear 1190 which is locked against rotation, the gear 1195 rotates around the gear 1184, and in so doing, rotates the shaft 1124 at one half the speed of gear 1188. Differential unit 1108, mounted on the shaft 1140, is identical in construction to differential unit 1106 as above described.

Briefly summarizing the operation of the yoke speed changing mechanism, either the normal speed brake 1100, the stop brake 1102 or the double speed brake 1104 will be energized at all times during operation. If the double speed brake is energized, a set of different gears is engaged which causes the yoke to rotate at twice its normal speed. If the stop brake is energized, a different set of differential gears is engaged which stops yoke rotation. If neither the double speed nor the stop brake is energized, the normal speed brake will be energize and the yoke will therefore rotate at normal or synchronous speed.

*Control element 98*

Reference is made to FIG. 5 wherein is shown in detail the control circuits shown in block form as Control Element 98 in FIG. 1*b*. In response to an unsynchronized range pulse on line 6, flip-flop 1502 is set in the Zero state of conduction and a flip-flop 1504 is set in the One state of conduction. The One output of the flip-flop 1504 conditions gates 1506 and 1508 while the Zero output conditions a gate 1510. An OD–2 pulse applied to gate 1512 is passed to gates 1510 and 1506 provided a flip-flop 1514 is in the One state to supply a positive level to the gate 1512. The previous OD–4 pulse passed by gate 1508 sets flip-flop 1514 to the One state. An output pulse from gate 1506 is applied on conductor 102 to the One input side of flip-flop 1516, and the Zero input side of flip-flop 1504. This pulse is also applied on conductor 102 as a synchronized range pulse to Display Control Circuit 86 and Azimuth and North Protection Circuit 38 (FIG. 1*a*). An output pulse from the gate 1510 is applied to the One input side of a flip-flop 1518.

An OD–2 pulse applied to the input of gate 1512 is also applied through delay unit 1520 to the zero input side of the flip-flop 1518. The zero output side of the flip-flop 1518 is connected to a cathode follower 1522, which in turn supplies an output to a power inverter 1524 and a negative AND circuit 1526. The output of power inverter 1524 is applied to core shift drivers 1528 through 1532. Core shift drivers 1528 and 1529 supply an output on respective conductors 126 and 128 to azimuth counter 106 in FIG. 1*b*. The output is in the form of pulses which serve to shift the azimuth counter. Core shift drivers 1530 and 1531 supply shift pulses on respective output conductors 130 and 132 to range counter 110 in FIG. 1*b*. Output pulses from core shift driver 1532 are applied on conductor 134 to shift the delay register 114 in FIG. 1*b*.

The negative AND circuit 1526 responds to negative inputs from the cathode follower 1522 and the zero output of the flip-flop 1502 to provide a negative output to the power inverter 1534, which in turn supplies an output on conductor 138 to core shift driver 1535 to shift the azimuth and range read-out registers 122 and 124 of FIG. 1*b*.

A pulse on conductor 136 labeled STOP SHIFT from the delay register 114 in FIG. 1*b* is applied to the zero input of the flip-flop 1514 in FIG. 12. When received, this pulse indicates that the shifting operation should be terminated. By setting the flip-flop 1514 to the zero state, the gate 1512 is deconditioned, thereby inhibiting further shift pulses. The positive output from the zero side of the flip-flop 1514 is applied through core shift driver 1515 and conductor 116 to reset the delay register 114 in FIG. 1*b*. Whenever flip-flop 1516 is set in the One state, its one output side supplies a positive signal through core shift driver 1517 to conductor 112 to prime the delay register 114 and provide an Add One range input to range counter 110 of FIG. 1*b*. The one output from the flip-flop 1516 in FIG. 5 is also applied to condition a gate 1536 which is sampled by OD–4 pulses to reset flip-flop 1516 and to sample a gate 1538. The gate 1538 serves to pass the pulse from gate 1536 provided that a positive signal level representing a filtered target is present on conductor 96.

An output pulse from the gate 1538 is applied to the one input side of the flip-flop 1502 and through an OR circuit 1540 to the zero input side of a flip-flop 1542. The one output side of the flip-flop 1502 is applied to a positive AND circuit 1544, the other input of which is from the One output side of flip-flop 1514. Whenever both inputs to the AND circuit 1544 are positive, a positive input is provided to a cathode follower 1546 and to the one input side of flip-flop 1542. The output of the cathode follower 1546 is applied as a reintensity signal on conductor 100 to Display Control Circuit 86 (FIG. 1*a*), and is also applied to the excess target counter 1548.

A drum demand pulse from the Write Status Circuit 156 in FIG. 1*b* is applied via conductor 150 to sample gates 1552 and 1554. If the flip-flop 1542 is in the Zero state, thereby supplying a positive level to the gate 1552, an output pulse is established from this gate on conductor 1556 which indicates No Data Available. If the flip-flop 1542 is in the One state when the drum demand pulse is received on conductor 150, gate 1554 yields an output pulse on conductor 152 labeled Data Available. As shown in FIG. 1*b*, this pulse is applied via delay unit 153 and write status circuit 156 to indicate that data is available. The output pulse from the gate 1554 is also applied to a single shot multivibrator 1558, which in turn drives a cathode follower 1560 and core shift driver 1561 to provide a read-out pulse on conductor 140 to the azimuth and range read-out registers 122 and 124 of FIG. 1*b*.

In operation, unsynchronized range pulses received on conductor 6 cause a series of shift pulse to be generated. This operation will now be described. An unsynchronized range pulse on conductor 6 sets flip-flop 1502 to the Zero state and flip-flop 1504 to the One state. Since the gate 1506 is now conditioned with a positive level from the one output side of the flip-flop 1504, the next OD–2 pulse passed by gate 1512 is also passed by the gate 1506 as a synchronized range pulse. By this operation the unsynchronized range pulses received on conductor 6 are synchronized by the Control Element with OD–2 pulses from the drum timing circuit 148 (FIG. 1*b*).

The pulses applied to power inverters 1524 and 1534 to effect shifting in the azimuth counter, range counter, delay register and read-out register in FIG. 1*b* are controlled by the flip-flop 1518. The flip-flop 1518 usually provides a positive signal from the Zero output side. However, each OD–2 pulse passed by the gate 1510 causes flip-flop 1518 to be set in the One state, thereby providing a negative output from the Zero output side. As soon as the OD–2 pulse passes through delay unit 1520, flip-flop 1518 is returned to the Zero state, thereby supplying a positive signal from the Zero output side. Since the output of power inverter 1524 has a polarity opposite that of the input, it can be seen that a positive pulse applied to the various core shift drivers is of a duration equal to the time that the Zero output level of flip-flop 1518 is negative. The duration of this period is determined by the amount of delay effected as the OD–2 pulse passes through delay unit 1520. The delay period of delay unit 1520 is sufficient to allow a core shift drive pulse to effect one shift. Accordingly, it is seen that the shift pulses from core shift drivers 1528 through 1532 and power inverter 1534 occur, if at all, at each OD–2 pulse, and persist for a period determined by the delay unit 1520.

In response to each unsynchronized range pulse received on conductor 6, the flip-flop 1504 is set to the One state, thereby conditioning gate 1506. If the flip-flop 1514, which is in the One state except when shifting operations are taking place, is supplying a positive level to condition gate 1512, an OD–2 pulse is passed which is applied to the gates 1506 and 1510. Since the gate 1506 is conditioned by a positive level from the One output of flip-flop 1504, a pulse is padded on conductor 102 to reset the flip-flop 1504 in the Zero state, thereby conditioning gate circuit 1510. The next OD–2 pulse passed by the gate 1512 is gated through gate 1510 to the One input side of the flip-flop 1518, thereby establishing a negative level at the Zero output side of this flip-flop. After a suitable delay produced by delay unit 1520, the OD–2 pulse causes the flip-flop 1518 to be returned to the Zero state, thereby establishing a positive level on the Zero output side. Each subsequent OD–2 pulse causes a similar change at the Zero output side of the flip-flop 1518 until a stop-shift pulse is received on conductor 136. This stop-shift pulse sets the flip-flop 1514 to the Zero state, providing a negative level on the One output side of this flip-flop to decondition the gate 1512, thereby setting flip-flop 1518 in the Zero state and preventing further OD–2 pulses from manipulating the flip-flop 1518. Once the flip-flop 1518 is set in the Zero state, power inverters 1524 and 1534 supply a constant negative level on their output side. As pointed out in detail in the above referred to copending application Serial Number 502,634 now U.S. Patent 3,131,295, the number of shift pulses required for the azimuth and range counters for each counting operation is equal to the number of stages in these counters. In the preferred embodiment the azimuth and range counters are each eight stage magnetic core shifting registers. Thus it can be seen that in response to each unsynchronized range pulse on input conductor 6, a series of shift pulses is supplied to the azimuth counter 106, range counter 110 and delay register 114 in FIG. 1*b*.

Prior to the series of shift pulses supplied to the azimuth and range counters, an Add One range input signal is supplied on conductor 112 to the range counter 110 in FIG. 1*b*. This is accomplished by the synchronized range pulse from the gate 1506, which is applied to the One input of the flip-flop 1516, which in turn causes a positive signal level to be established on output conductor 112. The flip-flop 1516 supplies this Add One range signal through core shift driver 1517 simultaneously as the flip-flop 1504 conditions the gate 1510. Thus the series of shift pulses is not initiated until the following OD–2 pulse. The shift pulses applied to the azimuth counter fail to advance the count contained therein unless an azimuth pulse is first received by the azimuth counter 106. It is recalled that if the displayed target is not masked, the resulting blue flash on the cathode ray tube screen is detected by the photopickup 94, and the resulting filtered target signal applied through conductor 96 to control element 98. Since the count in the azimuth and range counters define the position of a target, it is necessary to read out the contents thereof whenever a filtered target signal is received. The operations performed by the Control Element 98 in FIG. 5 to cause readout of the range and azimuth counters in response to the filtered target pulse on input conductor 96 will now be explained.

Flip-flop 1516, which is in the One state after a synchronized range pulse has caused an Add One range output, conditions the gate 1536 to pass an OD–4 pulse to the Zero input side of flip-flop 1516 and the gate 1538. This deconditions gate 1536 by setting the flip-flop 1516 to the Zero state of conduction. The gate 1538 provides an output pulse, if the filtered target signal is present, to the One input side of the flip-flop 1502, and through OR circuit 1540 to the Zero input of flip-flop 1542, thereby setting these flip-flops in the One and Zero states respectively. The positive level established from the One output of flip-flop 1502 is applied to positive AND circuit 1544. The other input to positive AND circuit 1544 is from the one output side of flip-flop 1514. The output of the positive AND circuit 1544 is applied to the One input side of the flip-flop 1542 and through the cathode follower 1546 to the output conductor 100 which supplies a reintensity level to Display Control Circuit 86 of FIG. 1*a*. The reintensity signal level on conductor 100 is also applied to the excess target counter 1548. The excess target counter 1548 controls a relay driver 1550 which actuates an alarm circuit in the event that an excessive number of targets are received on input conductor 96 within a given period, indicating that an area may not have been properly mapped. In the preferred embodiment, as heretofore described, the time relation is such that the duration of a filtered target signal on conductor 96 is approximately 43 microseconds, and the duration of the resulting reintensity signal on output conductor 100 is approximately 180 microseconds.

The flip-flop 1542, in response to the positive output signal from the positive AND circuit 1544, conditions the gate 1554 to pass a drum demand pulse on conductor 150 to the input of the single shot multivibrator 1558. The output of multivibrator 1558 is applied through cathode follower 1560 and core shift driver 1561 to output conductor 140, thereby causing readout of the azimuth readout register 122 and the range readout register 124 (FIG. 1*b*). Multivibrator 1558 serves to convert the .1 microsecond input pulse to a pulse on its output having sufficient width to cause readout of magnetic core circuits in the azimuth and range readout registers 122 and 124 respectively in FIG. 1*b*. Thus it can be seen that a filtered target pulse on input conductor 96 to the Control Element in FIG. 12 causes a positive reintensity signal on output conductor 100; it further serves with a drum demand pulse on input conductor 150 to establish a read-out pulse on output conductor 140. It is also pointed out that a pulse on conductor 152, indicating data available, is supplied through delay unit 153 to gates 142 and 144 as well as to the Write Status Circuit 156 in FIG. 1*b* each time a read-out pulse is established on output conductor 140. The data available pulse on conductor 152 conditions the Drum Write Circuit 168 to accept the information supplied from the azimuth readout register 122 and the range readout register 124 to the gates 142 and 144 respectively, as more fully explained in the above referred to copending application Serial Number 494,982. In the event that no filter target signal is received on input conductor 96, the flip-flop 1542 continues in the Zero state to which it is set by the data available pulse on conductor 152 applied through OR circuit 1540. Consequently, drum demand pulses received while flip-flop 1542 is in the Zero state are passed by the gate 1552 to the output conductor 1556, representing no data available. The output of gate 1552 labeled No Data Available may be employed in an arrangement such as shown in copending application Serial Number 494,982, to accommodate the entry of data from a plurality of equipments such as previously described on to a common drum.

*Yoke North pulse generator*

Referring now to FIG. 6, there is illustrated in schematic form the Yoke North Photopickup and associated circuitry shown in block form in FIG. 8*a*. As shown and described with reference to FIG. 8*a*, when the yoke rotates through its North position, a yoke North pulse is generated by a photopickup in response to a light beam passing between the slits of two rotating members, when the yoke passes through the North position. The yoke North photopickup is shown as block 1148 in FIG. 8*a*.

Referring now specifically to FIG. 6, the photo pickup includes a photo multiplier tube, an associated amplifier and an output cathode follower. When the light beam strikes the light sensitive cathode 1561 of photo multiplier 1560, the cathode thereupon emits electrons. Photo multiplier 1560 includes cathode 1561, anode 1562 and intermediate dynodes 1563 through 1568. Resistors 1571 through 1576 comprise a voltage divider network which causes each dynode to be at an increasingly more positive potential than the immediately preceding dynode. The operation of the photo multiplier 1560 is substantially identical to the operation of the photo multiplier described in reference to the photo pickup circuit shown in copending application Serial No. 569,999 now U. S. Patent 3,072,818. When excited, the six stage photo multiplier develops a negative 20 volt signal at anode 1562.

The output of photo multiplier 1560 is applied through capacitor 1577 to control grid 1578 of pulse amplifier 1580. Pulse amplifier 1580 normally conducts very heavily, since it has no cathode bias resistor and no external fixed bias on the grid 1578. During the generation of the photo multiplier output pulse, pulse amplifier 1580 is cut off. The resulting waveform at anode 1579 is a rectangular wave having an amplitude of approximately 200 volts. This signal is coupled through capacitor 1584 to a voltage divider network comprising resistors 1585 and 1586, which functions to prevent the output cathode follower stage 1590 from being overdriven. The control grid 1587 of cathode follower 1590 is biased by an external source of negative 15 volts applied through resistor 1586. Resistor 1588 is a parasitic suppressor associated with control grid 1587.

When a positive pulse from pulse amplifier 1580 is applied to control grid 1587 of cathode follower 1590, it is limited by grid current flow through parasitic suppressor 1588 so that it does not have the full amplitude established at junction 1589 of the above described voltage divider network. Because of the comparatively high value of cathode resistor 1592, the output pulse of the cathode follower stage at conductor 74 is almost substantially identical in amplitude with the input pulse. This pulse, referred to as a filtered target signal, is then applied through conductor 74 to the North Synchronizing Circuit 64 to function in the manner heretofore described.

Details of the following circuits are fully shown and described in copending application Serial No. 569,999 now U.S. Patent 3,072,818.

Figure 3:
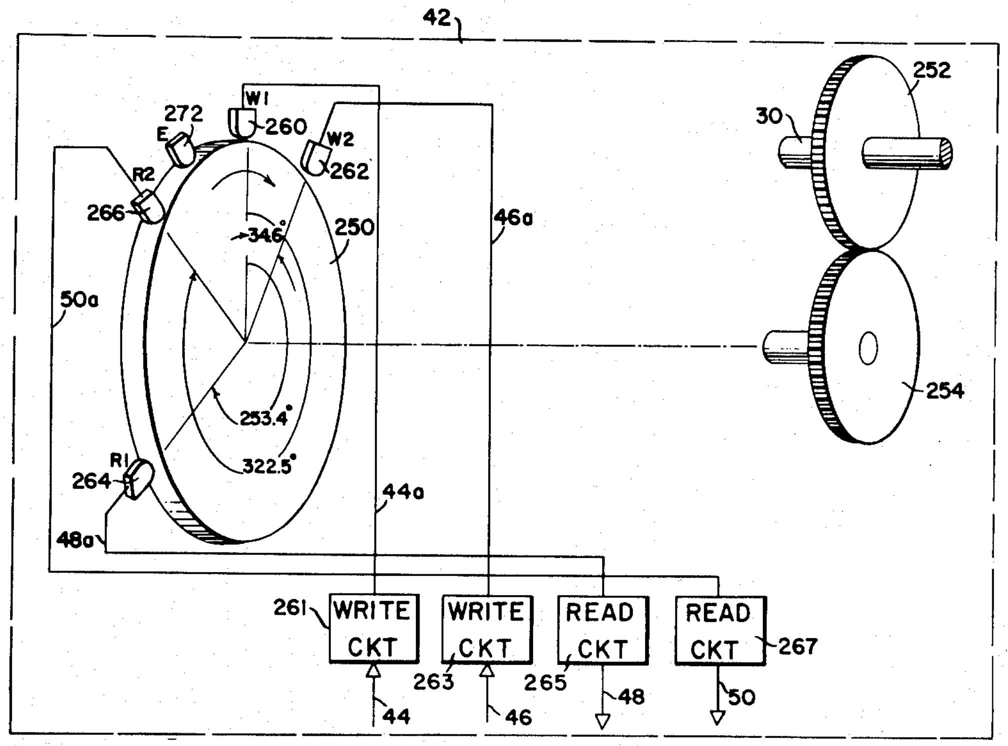
FIG. 3 illustrates in simplified schematic form the Substitute Azimuth Generator identified as block 42 in FIG. 1*a*.

| Title: | Block identification |
|---|---|
| Start and Alarm Circuit | Block **10** in FIG. 1*a*. |
| Azimuth Synchronizing Circuit | Block **20** in FIG. 1*a*. |
| Motor Drive Circuit | Block **64** in FIG. 1*a*. |
| North Synchronizing Circuit | Block **64** in FIG. 1*a*. |
| Sweep Circuit | Block **82** in FIG. 1*a*. |
| Display Control Circuit | Block **86** in FIG. 1*a*. |
| Photopickup Circuit | Block **94** in FIG. 1*a*. |
| Excess Target Counter and Associated Relay Driver | Blocks **1548** and **1550** FIG. 5. |
| Drum Write Circuits | Blocks **261** and **263** in FIG. 3. |
| Drum Read Circuits | Block **265** in FIG. 3. |

*Other basic circuits*

The following basic circuits identified in block form in the instant application are shown and described in copending application Serial No. 569,999, now U.S. Patent 3,073,818. The model C pulse generator ($_{C}PG$), the model D flip flop ($_{D}FF$).

Each of the following Basic Circuits may be of the type illustrated and described in copending application Serial Number 471,002 entitled "Electronic Data Processing Machine" filed by H. D. Ross et al. on November 24, 1954.

| Title | Abbreviation | Page No. | Figure |
|---|---|---|---|
| Gate Circuit Model A | $_{A}GT$ | 142–144 | 46 |
| Cathode Follower Model A | $_{A}CF$ | 146–148 | 49 |
| Cathode Follower Model B | $_{B}CF$ | 146–148 | |
| Logical+OR Circuit | +OR | 148–151 | 50 |
| Logical +AND Circuit | +AND | 151–152 | |
| Delay Unit | DU | 152–153 | 51 |

With reference to the above described logical circuits, it should be noted that a positive OR circuit may also be identified as a negative AND circuit.

With reference to the above described Delay Unit, shorter delays may be obtained by tapping off the delay unit at appropriate terminals.

With reference to the above described cathode followers, the present apparatus also employs model D and parallel connected models H and J cathode followers. The model D and H cathode followers differ from the identified model A and B cathode followers only in the value of the cathode impedance. The model D and H cathode followers have equivalent cathode impedances of 21.2 k. and 40.1 k. ohms respectively. The model J cathode follower does not have its own cathode resistor but must be used in parallel with another cathode follower which provides the cathode resistance for both. Where a plurality of cathode followers are employed in parallel, the number is shown as a subscript associated with the model number within the block.

The model C flip-flop employed in the subject apparatus may be of the type illustrated in FIG. 21 and described on pages 61–65 of copending application Serial Number 494,982 now U.S. Patent No. 2,988,735 entitled "Magnetic Data Storage" filed by R. R. Everett et al. March 17, 1955.

Core shift drivers labeled CSD employed in the present apparatus are preferably of the type illustrated and described in copending application Serial Number 502,634 entitled "Counter Circuit" filed by H. K. Rising et al., April 20, 1955, now U.S. Patent 3,131,295.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. An apparatus for synchronizing a common reference position of two rotatable members comprising means responsive to the rotation of a first one of said members to generate a succession of uniformly spaced repetitive signals, a motor responsive to said uniformly spaced repetitive signals for controlling the rotation of said second rotatable member, means for detecting the absence of one of said repetitive signals and generating a substitute signal therefore, means for generating a signal indicating a common reference position of each of said respective rotatable members, means for generating a signal corresponding to the time difference between said reference signals, and a position correction apparatus associated with said second rotatable member and responsive to said time difference signal for generating the necessary position correction to bring said rotatable members into synchronization, said correction apparatus functioning independently of said motor.

2. An apparatus for synchronizing the rotation of two remotely positioned rotatable members comprising first and second rotatable members, each of said members including signal generating means adapted to generate a synchronizing signal in response to a reference position during each rotation of said members, means for controlling the rotation of said first rotatable members by repetitive signals emitted by said second rotatable member, position correction apparatus associated with said first rotatable member for synchronizing said reference position of said first and second rotatable members, means for determining the relative sequence and time interval between said reference signals generated by said first and second rotatable members and means for energizing said position correction apparatus for said time interval to provide the necessary correction to said first rotatable member to thereby bring said rotatable member into synchronizm.

3. An apparatus as described in claim 2 wherein said position correction apparatus comprises an electro-mechanical assembly adapted to selectively and individually accelerate or decelerate said second rotatable member according to the relative sequence of the reference signals for a time equal to the interval between said reference signals.

4. A system for synchronizing two rotatable members comprising in combination a first and second rotatable member, means to generate a succession of repetitive signals in response to the rotation of said first rotatable member, means to generate a position reference signal during each rotation of said first rotatable member, means for controlling the rotation of said second rotatable member in response to said succession of repetitive signals, means for generating a position reference signal during each rotation of said second rotatable member, means for generating a signal corresponding in duration to a time difference between said reference signals, and means responsive to the relative sequence and duration of said last named signal for accelerating or decelerating said second rotatable member to bring said rotatable members into synchronism.

5. A system of the character described in claim 4 wherein said means for varying the rotational speed of said second rotatable member comprises a mechanism adapted in response to a first condition to stop the rotation of said second rotatable member for an interval corresponding to said time duration and in response to a second condition to double the rotational speed of said second rotatable member for an interval corresponding to said time duration.

6. An apparatus adapted to cause rotation of a shaft in synchronism with signals generated by a remote rotating member, said signals varying at a repetition rate determined by the rotational speed of said rotating member comprising a motor adapted to drive said shaft, means for converting said signals into a potential having a frequency corresponding to the repetition rate of said incoming signals, means for applying said potentials to said motor to cause rotation at a speed corresponding to the frequency of said potential, means for synchronizing a reference point on said shaft with a corresponding point on said remote rotating member and means for maintaining said shaft in correct polar orientation with said rotating member, said means including a speed changing mechanism adapted to produce a change in shaft speed with no corresponding change in the speed of said motor.

7. An apparatus for synchronizing a common reference position of two rotatable members comprising means responsive to the rotation of a first one of said members to generate a succession of uniformly spaced repetitive signals, a motor responsive to said uniformly spaced repetitive signals for controlling the rotation of said second rotatable member, means for detecting the absence of one of said repetitive signals and generating a substitute signal therefore, means for generating a signal indicating a common reference position of each of said respective rotatable members and a position correction apparatus associated with said second rotatable member for generating the necessary correction to bring said rotatable members into synchronization, said correction apparatus functioning independently of said motor.

8. Apparatus for synchronizing two rotating members comprising first and second rotating members, each of said rotating members being adapted to generate a signal in response to a reference position, a position correcting mechanism adapted in response to a first condition to interrupt the rotating of one of said members and in response to a second condition to double the speed of rotation of one of said members and means response to the relative occurence and time difference between the reference signals of said rotating members to actuate said position correcting mechanism for the time and under the condition required to bring said rotating members into synchronism.

9. An apparatus adapted to synchronize the corresponding position of two rotatable members comprising means for generating a first and second signal indicating a reference position of each of said members, means for generating a third signal equal in duration to the time interval between said first and second signals and means responsive to said third signal to accelerate said second rotatable member for said time interval whereby said rotatable members are brought into position synchronism, said means to accelerate said second rotatable member comprising as electromechanical speed changing apparatus automatically actuated to accelerate said second rotatable member to double its normal speed for said time interval whenever the reference position of said second rotatable member lags the reference position of said first rotatable member.

References Cited by the Examiner

UNITED STATES PATENTS

| | | | |
|---|---|---|---|
| 1,828,272 | 10/31 | Ashbaugh et al. | 318—324 |
| 2,238,617 | 4/41 | Baker | 318—324 |
| 2,418,112 | 4/47 | De Rosa | 318—41 |
| 2,418,134 | 4/47 | Mitchell | 318—41 |
| 2,419,637 | 4/47 | Gabriel et al. | 318—70 |
| 2,749,496 | 6/56 | Newman et al. | 318—314 |
| 2,863,108 | 12/58 | Raffensberger | 318—341 X |
| 2,881,377 | 4/59 | Apa et al. | 318—314 |
| 3,034,028 | 5/62 | Jamieson | 318—341 X |
| 3,034,117 | 5/62 | Tower et al. | 343—11 |

FOREIGN PATENTS

| | | |
|---|---|---|
| 880,317 | 6/53 | Germany. |

JOHN F. COUCH, *Primary Examiner.*

MILTON O. HIRSHFIELD, *Examiner.*